(12) United States Patent
Kasahara et al.

(10) Patent No.: US 9,273,999 B2
(45) Date of Patent: *Mar. 1, 2016

(54) SPECTROSCOPIC SENSOR

(71) Applicant: HAMAMATSU PHOTONICS K.K., Hamamatsu-shi, Shizuoka (JP)

(72) Inventors: Takashi Kasahara, Hamamatsu (JP); Katsumi Shibayama, Hamamatsu (JP)

(73) Assignee: HAMAMATSU PHOTONICS K.K., Hamamatsu-shi, Shizuoka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/400,686

(22) PCT Filed: May 8, 2013

(86) PCT No.: PCT/JP2013/062919
§ 371 (c)(1),
(2) Date: Nov. 12, 2014

(87) PCT Pub. No.: WO2013/172231
PCT Pub. Date: Nov. 21, 2013

(65) Prior Publication Data
US 2015/0131101 A1  May 14, 2015

(30) Foreign Application Priority Data
May 18, 2012  (JP) .................................. 2012-114340

(51) Int. Cl.
*G01C 9/00* (2006.01)
*G01B 9/02* (2006.01)
(Continued)

(52) U.S. Cl.
CPC .... *G01J 3/26* (2013.01); *G01J 3/36* (2013.01); *G01J 3/45* (2013.01)

(58) Field of Classification Search
CPC ................. G01J 3/26; G01J 3/45; G01J 3/28; H01L 31/1896; G02B 5/288; G02B 5/281
USPC ..................... 356/326, 454, 451, 519; 438/65; 156/247
See application file for complete search history.

(56) References Cited

U.S. PATENT DOCUMENTS

| 4,957,371 A | 9/1990 | Pellicori et al. |
| 5,784,507 A | 7/1998 | Holm-Kennedy et al. |

(Continued)

FOREIGN PATENT DOCUMENTS

| CN | 1065523 | 10/1992 |
| CN | 1498340 | 5/2004 |

(Continued)

OTHER PUBLICATIONS

English-language translation of International Preliminary Report on Patentability (IPRP) dated Nov. 27, 2014 that issued in WO Patent Application No. PCT/JP2013/062953.

(Continued)

*Primary Examiner* — Tarifur Chowdhury
*Assistant Examiner* — Sunghee Y Gray
(74) *Attorney, Agent, or Firm* — Drinker Biddle & Reath LLP

(57) ABSTRACT

A spectroscopic sensor 1A comprises an interference filter unit 20A having a cavity layer 21 and first and second mirror layers 22, 23 and a light detection substrate 30 having a light-receiving surface 32a for receiving light transmitted through the interference filter unit 20A. The interference filter unit 20A has a first filter region 24 corresponding to the light-receiving surface 32a and a ring-shaped second filter region 25 surrounding the first filter region 24. The distance between the first and second mirror layers 22, 23 varies in the first filter region 24 and is fixed in the second filter region 25.

7 Claims, 20 Drawing Sheets

(51) Int. Cl.
  *H01L 21/00* (2006.01)
  *B29C 65/00* (2006.01)
  *G02B 27/00* (2006.01)
  *G02B 1/10* (2015.01)
  *G03B 21/56* (2006.01)
  *G01J 3/26* (2006.01)
  *G01J 3/36* (2006.01)
  *G01J 3/45* (2006.01)

(56) References Cited

U.S. PATENT DOCUMENTS

| | | | |
|---|---|---|---|
| 2003/0173504 | A1 | 9/2003 | Cole et al. |
| 2005/0013000 | A1 | 1/2005 | Uehara |
| 2012/0109584 | A1* | 5/2012 | Urushidani .................. 702/189 |
| 2013/0153139 | A1* | 6/2013 | Shibayama et al. ......... 156/247 |

FOREIGN PATENT DOCUMENTS

| | | |
|---|---|---|
| CN | 1518660 | 8/2004 |
| CN | 1888833 | 1/2007 |
| CN | 101622517 | 1/2010 |
| CN | 101680804 | 3/2010 |
| CN | 101970993 | 2/2011 |
| CN | 102027342 | 4/2011 |
| JP | S53-39784 A | 4/1978 |
| JP | S57-151830 A | 9/1982 |
| JP | S58-195127 A | 11/1983 |
| JP | S59-72861 A | 4/1984 |
| JP | S62-170647 U | 10/1987 |
| JP | S62-267623 A | 11/1987 |
| JP | S64-35325 A | 2/1989 |
| JP | H02-502490 A | 8/1990 |
| JP | H05-322653 A | 12/1993 |
| JP | H6-120462 A | 4/1994 |
| JP | H6-129908 A | 5/1994 |
| JP | H10-078353 | 3/1998 |
| JP | 2005-037762 A | 2/2005 |
| JP | 2006-058301 A | 3/2006 |
| JP | 2006-284474 A | 10/2006 |
| JP | 2008-232843 | 10/2008 |
| JP | 2011-203247 A | 10/2011 |
| JP | WO2012070302 * 5/2012 ................ G01J 3/26 |
| WO | WO 03/091676 | 11/2003 |

OTHER PUBLICATIONS

English-language translation of International Preliminary Report on Patentability (IPRP) dated Nov. 27, 2014 that issued in WO Patent Application No. PCT/JP2013/062915.

English-language translation of International Preliminary Report on Patentability (IPRP) dated Nov. 27, 2014 that issued in WO Patent Application No. PCT/JP2013/062919.

* cited by examiner (a)

(b)

(a)

(b)

(a)

(b)

(a)

(b)

(a)

(b)

(a)

(b)

(a)

(b)

(a)

(b)

(a)

(b)

(a)

(b)

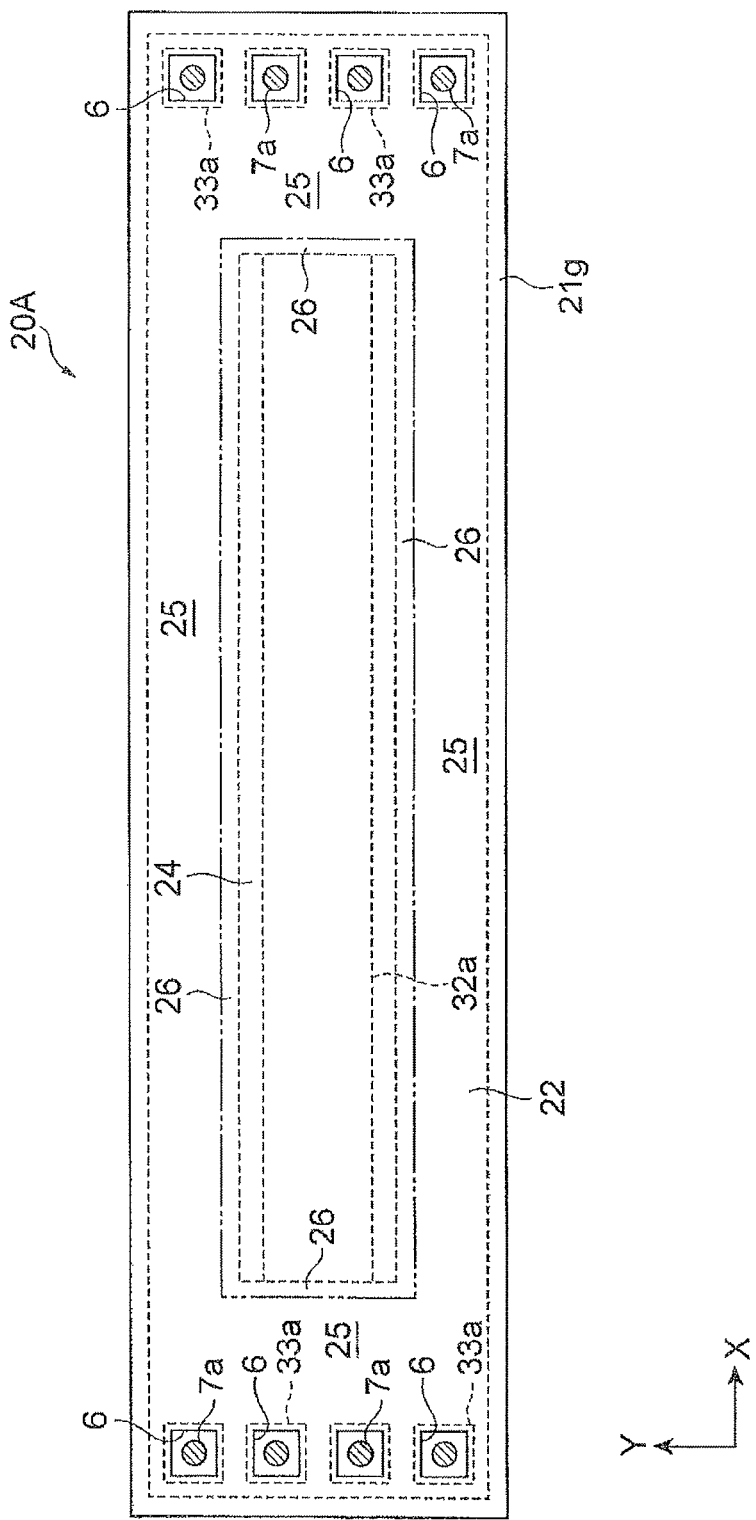

SPECTROSCOPIC SENSOR

TECHNICAL FIELD

The present invention relates to a spectroscopic sensor.

BACKGROUND ART

Known as a conventional spectroscopic sensor is one comprising an optical filter unit for selectively transmitting therethrough a predetermined wavelength range of light according to an incident position thereof and a light detection substrate for detecting the light transmitted through the optical filter unit. In spectroscopic sensors disclosed in Patent Literatures 1 and 2, for example, the optical filter unit is provided so as to correspond to a light-receiving surface of the light detection substrate and functions as a whole as a filter region for transmitting therethrough light to be incident on the light-receiving surface of the light detection substrate.

CITATION LIST

Patent Literature

Patent Literature 1: Japanese Patent Application. Laid-Open No. 2006-58301
Patent Literature 2: Japanese Translated International Application Laid-Open No. H02-502490

SUMMARY OF INVENTION

Technical Problem

Since the optical filter unit as a whole functions as a filter region for transmitting therethrough light to be incident on the light-receiving surface of the light detection substrate, however, filter characteristics may immediately deteriorate if a side face of the optical filter unit is adversely affected in any way in the spectroscopic sensors disclosed in Patent Literatures 1 and 2. Also, noise light may easily enter the optical filter unit from a side face thereof.

It is therefore an object of the present invention to provide a spectroscopic sensor which can prevent filter characteristics of a filter region transmitting therethrough light to be incident on the light-receiving surface of the light detection substrate from deteriorating and restrain noise light from entering the filter region.

Solution to Problem

The spectroscopic sensor of the present invention comprises an interference filter unit, having a cavity layer and first and second mirror layers opposing each other through the cavity layer, for selectively transmitting therethrough a predetermined wavelength range of light according to an incident position thereof from the first mirror layer side to the second mirror layer side; and a light detection substrate, having a light-receiving surface for receiving the light transmitted through the interference filter unit, for detecting the light incident on the light-receiving surface; the interference filter unit having a first filter region corresponding to the light-receiving surface as seen in a predetermined direction intersecting the light-receiving surface and a ring-shaped second filter region surrounding the first filter region as seen in the predetermined direction; the distance in the predetermined direction between the first and second mirror layers varying in the first filter region; the distance in the predetermined direction between the first and second mirror layers being fixed in the second filter region.

In this spectroscopic sensor, the first filter region for transmitting therethrough light to be incident on the light-receiving surface of the light detection substrate is surrounded by the ring-shaped second filter region as seen in a predetermined direction intersecting the light-receiving surface. This makes the second filter region protect the first filter region and thus can prevent filter characteristics of the first filter region from deteriorating. In addition, the distance in the predetermined direction between the first and second mirror layers is fixed in the second filter region. This can narrow the wavelength range of light transmittable through the second filter region, thereby restraining noise light from entering the first filter region. By "fixed" is meant not only completely fixed but also substantially fixed within ranges of errors in manufacture and the like.

Here, the light detection substrate may have a plurality of pad units for wiring contained in the second filter region as seen in the predetermined direction, the second filter region being formed with a plurality of through holes for the respective pad units for exposing the pad units to the outside, wires being connected to the respective pad units through the through holes. In this structure, when seen in the predetermined direction intersecting the light-receiving surface, the second region exists in a ring-shaped area about the first filter region passing the inside of the through holes and an area between the through holes adjacent to each other, thereby making it possible to restrain noise light from entering the first filter region even when the through holes for connecting the pad units to the wires are formed.

The spectroscopic sensor may further comprise an optical filter unit for transmitting therethrough at least the light incident on the second filter region, a wavelength range of the light transmitted through the optical filter unit and a wavelength range of the light transmitted through the second filter region being different from each other. This structure lets the optical filter unit and the second filter region cooperate with each other, so that the wavelength range of light transmittable through both of the optical filter unit and second filter region becomes narrower, thereby making it possible to more strongly restrain noise light from entering the first filter region.

The cavity layer may be formed continuously in the first and second filter regions. This structure can stabilize the cavity layer in terms of strength and characteristic.

The first mirror layer may be formed continuously in the first and second filter regions, while the second mirror layer may be fainted continuously in the first and second filter regions. This structure can stabilize the first and second mirror layers in terms of strength and characteristic.

The second filter region may contain the first filter region as seen in a direction parallel to the light-receiving surface. This structure lets the second filter region receive external forces, if any, acting along a direction perpendicular to the light-receiving surface and thus can prevent the first filter region from being damaged.

The predetermined direction may be a direction perpendicular to the light-receiving surface. This configuration can simplify the structure of the spectroscopic sensor.

Advantageous Effects of Invention

The present invention can provide a spectroscopic sensor which can prevent filter characteristics of a filter region for transmitting therethrough light to be incident on the light-receiving surface of the light detection substrate from deteriorating and restrain noise light from entering the filter region.

BRIEF DESCRIPTION OF DRAWINGS

FIG. 20 is a partly sectional view taken along the line XX-XX of FIG. 19.

DESCRIPTION OF EMBODIMENTS

Figure 1:
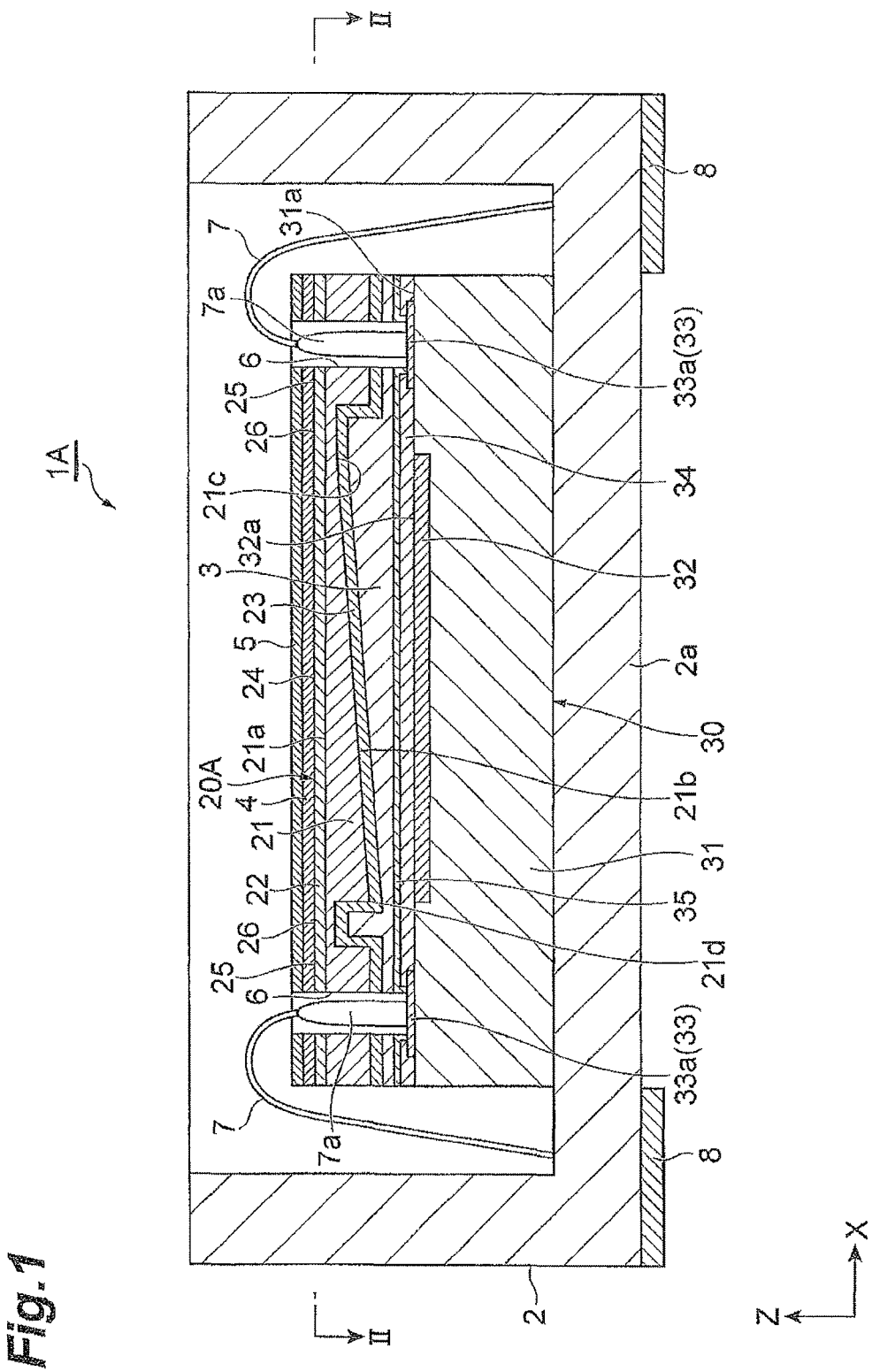
FIG. 1 is a vertical sectional view of the spectroscopic sensor in accordance with a first embodiment of the present invention.

In the following, preferred embodiments of the present invention will be explained in detail with reference to the drawings. In the drawings, the same or equivalent parts will be referred to with the same signs while omitting their overlapping descriptions.

First Embodiment

As illustrated in FIG. 1, a spectroscopic sensor 1A of the first embodiment comprises an interference filter unit 20A, a light detection substrate 30, and a package 2 containing the interference filter unit 20A and light detection substrate 30. The package 2 is formed from a resin or the like into a rectangular parallelepiped box and opens on one side (the light entrance side of the interference filter unit 20A and light detection substrate 30) in the height direction. In the following explanation, X, Y, and Z axes are set in the length, width, and height directions of the package 2, respectively.

The light detection substrate 30 is secured onto a bottom wall 2a within the package 2. The interference filter unit 20A is joined onto the light detection substrate 30 with a coupling layer 3 interposed therebetween. An optical filter layer (optical filter unit) 4 is formed on the interference filter unit 20A, while a protective film 5 is formed on the optical filter layer 4. For example, the coupling layer 3 is a silicon oxide film formed by film-forming processing using TEOS (Tetraethyl Orthosilicate, Tetraethoxysilane) as a material gas and has a thickness on the order of several tens of nm to several tens of μm. The optical filter layer 4 is a dielectric multilayer film or organic color filter (color resist) and has a thickness on the order of several tens of nm to several tens of μm. The protective film 5 is made of $SiO_2$ or the like and has a thickness on the order of several tens of nm to several tens of μm.

The light detection substrate 30 is a semiconductor light-receiving element having a semiconductor substrate 31 shaped into a rectangular plate whose longitudinal and thickness directions lie along the X and Z axes, respectively. A light-receiving unit 32 is formed in a part including a surface 31a on one side of the semiconductor substrate 31. The light-receiving unit 32 is a photodiode array in which linear photodiodes each extending along the Y axis are arranged one-dimensionally along the X axis. The light-receiving unit 32 has a light-receiving surface 32a on which light transmitted through the interference filter unit 20A is incident, while the light detection substrate 30 is constructed such as to detect the light incident on the light-receiving surface 32a. For example, the semiconductor substrate 31 has a thickness on the order of several tens of μm to several hundreds of μm. The light-receiving unit 32 has a length along the X axis on the order of several hundreds of μm to several tens of mm and a width along the Y axis of several μm to several tens of mm. The light detection substrate 30 may also be any of other semiconductor light-receiving elements (C-MOS image sensors, CCD image sensors, infrared image sensors, and the like).

Pad units 33a for leads 33 for inputting and outputting electric signals with respect to the light-receiving unit 32 are formed on the surface 31a of the semiconductor substrate 31. A protective film 34 is formed on the surface 31a of the semiconductor substrate 31 so as to cover the light-receiving unit 32 and leads 33, while a planarization layer 35 whose surface on the interference filter unit 20A side is planarized by CMP (Chemical Mechanical Polishing) is formed on the protective film 34. For example, the protective film 34 is made of $SiO_2$ or the like and has a thickness on the order of several tens of nm to several tens of μm. The planarization layer 35 is made of $SiO_2$ or the like and has a thickness on the order of several tens of nm to several tens of μm.

The interference filter unit 20A has a cavity layer 21 and first and second mirror layers 22, 23 opposing each other through the cavity layer 21. The interference filter unit 20A is an LVF (Linear Variable Filter) which selectively transmits therethrough a predetermined wavelength range of light according to an incident position thereof from the first mirror layer 22 side to the second mirror layer 23 side. For example, the cavity layer 21 is a silicon oxide film ($SiO_2$ film) formed by thermally oxidizing silicon and has a thickness on the order of several tens of nm to several tens of μm. Each of the mirror layers 22, 23 is a DBR (Distributed Bragg Reflector)

layer constituted by a dielectric multilayer film made of $SiO_2$, SiN, $TiO_2$, $Ta_2O_5$, $Nb_2O_5$, $Al_2O_3$, $MgF_2$, Si, Ge, and the like and has a thickness on the order of several tens of nm to several tens of μm.

Figure 2:
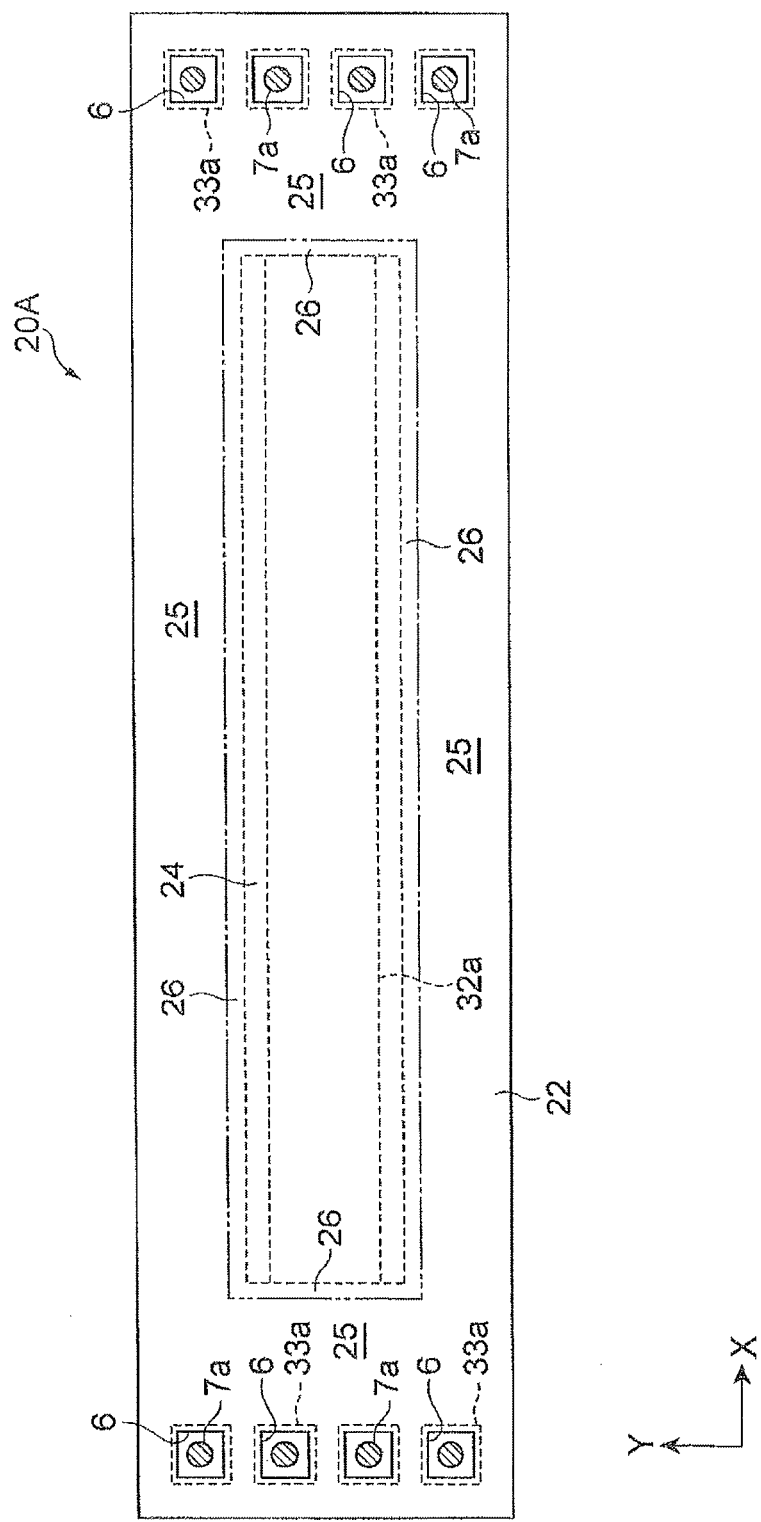
FIG. 2 is a partly sectional view taken along the line II-II of FIG. 1.

As illustrated in FIGS. 1 and 2, the interference filter unit 20A has a first filter region 24, a second filter region 25, and a connection region 26. The first filter region 24 corresponds to the light-receiving surface 32a of the light detection substrate 30 as seen in the Z axis (a direction perpendicular to the light-receiving surface 32a). That is, the first filter region 24 and light-receiving surface 32a are formed such that one of them contains the other as seen in the Z axis (encompassing a case where they are equal to each other in terms of at least one of the length along the X axis and width along the Y axis). The second filter region 25 surrounds the first filter region 24 like a ring (a rectangular ring here) with the connection region 26 interposed therebetween as seen in the Z axis. The second filter region 25 contains the first filter region 24 as seen in a direction perpendicular to the Z axis (i.e., a direction parallel to the light-receiving surface 32a). For example, the connection region 26 has a width on the order of several μm to 1 mm.

As illustrated in FIG. 1, the front face 21a of the cavity layer 21 in the first filter region 24 is parallel to the XY plane. On the other hand, the rear face 21b of the cavity layer 21 in the first filter region 24 tilts from the XY plane such that one end 21c in the X-axis direction of the rear face 21b is separated from a plane including the light-receiving surface 32a (e.g., the surface 31a of the semiconductor substrate 31) more than is the other end 21d in the X-axis direction of the rear face 21b. For example, the thickness of the cavity layer 21 in the first filter region 24 gradually decreases toward one side in the X-axis direction within the range on the order of several tens of nm to several μm.

The front face 21a and rear face 21b of the cavity layer 21 in the second filter region 25 are parallel to the XY plane. The distance along the Z axis (which will hereinafter be simply referred to as "distance") from the plane including the light-receiving surface 32a to the front face 21a of the cavity layer 21 in the second filter region 25 equals the distance from the plane including the light-receiving surface 32a to the front face 21a of the cavity layer 21 in the first filter region 24. On the other hand, the distance from the plane including the light-receiving surface 32a to the rear face 21b of the cavity layer 21 in the second filter region 25 equals the distance from the plane including the light-receiving surface 32a to the other end 21d of the rear face 21b of the cavity layer 21 in the first filter region 24. For example, the thickness of the cavity layer 21 in the second filter region 25 is about 700 nm.

The front face 21a and rear face 21b of the cavity layer 21 in the connection region 26 are parallel to the XY plane. The distance from the plane including the light-receiving surface 32a to the front face 21a of the cavity layer 21 in the connection region 26 equals the distance from the plane including the light-receiving surface 32a to the front face 21a of the cavity layer 21 in the first filter region 24. On the other hand, the distance from the plane including the light-receiving surface 32a to the rear face 21b of the cavity layer 21 in the connection region 26 equals the distance from the plane including the light-receiving surface 32a to one end 21c of the rear face 21b of the cavity layer 21 in the first filter region 24. For example, the thickness of the cavity layer 21 in the connection region 26 is about 500 nm.

As in the foregoing, the cavity layer 21 is formed continuously over the first filter region 24, second filter region 25, and connection region 26. The front face 21a of the cavity layer 21 is flush in the first filter region 24, second filter region 25, and connection region 26. On the other hand, the rear face 21b of the cavity layer 21 has a difference in level between the first filter region 24 and the connection region 26 which becomes the smallest (0 here) at one end 21c and the largest at the other end 21d. The rear face 21b of the cavity layer 21 has a fixed difference in level between the second filter region 25 and the connection region 26.

The first mirror layer 22 is formed continuously on the front face 21a of the cavity layer 21 over the first filter region 24, second filter region 25, and connection region 26. On the other hand, the second mirror layer 23 is formed continuously on the rear face 21b of the cavity layer 21 and the vertical surfaces of the difference in level (risers) over the first filter region 24, second filter region 25, and connection region 26. Hence, the distance between the first and second mirror layers 22, 23 varies in the first filter region 24. The distance between the first and second mirror layers 22, 23 is fixed in the second filter region 25.

Figure 3:
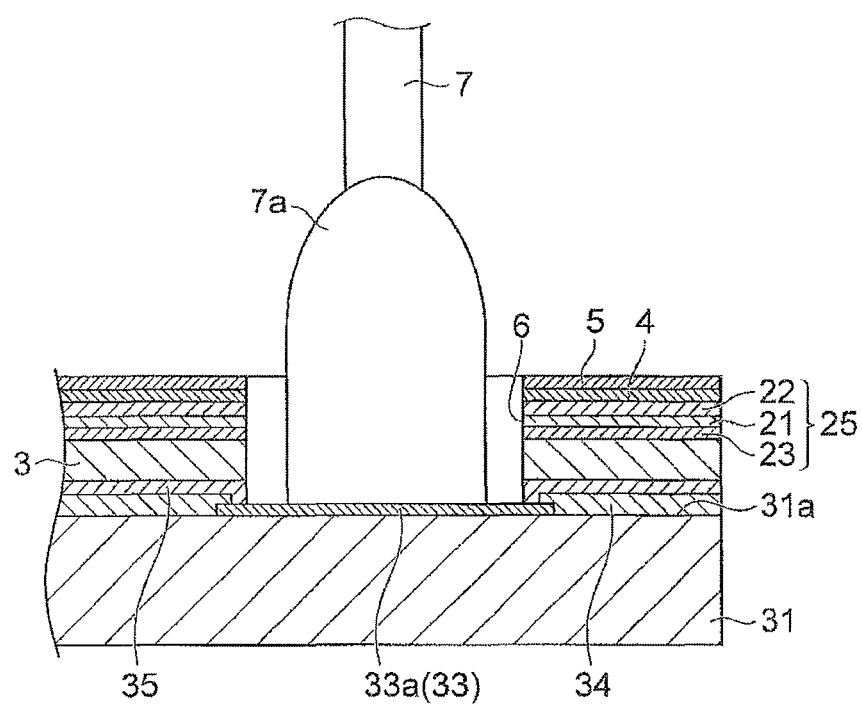
FIG. 3 is an enlarged vertical sectional view of a pad unit and parts thereabout in the spectroscopic sensor of FIG. 1.

As illustrated in FIGS. 1 and 2, a plurality of pad units 33a for the leads 33 in the light detection substrate 30 are formed on the surface 31a of the semiconductor substrate 31 so as to be contained in the second filter region 25 as seen in the Z axis. More specifically, a plurality of pad units 33a are provided in a row along the Y axis in each of both end regions in the X-axis direction of the surface 31a. As illustrated in FIGS. 1 and 3, a plurality of through holes 6 for exposing the pad units 33a to the outside are formed in the second filter region 25 for the respective pad units 33a. Each through hole 6 penetrates through the protective film 34, planarization layer 35, coupling layer 3, second filter region 25 (i.e., the cavity layer 21 and first and second mirror layers 22, 23), optical filter layer 4, and protective film 5 along the Z axis, so as to expose a part (or whole) of the pad unit 33a to the outside. Since FIG. 1 emphasizes the thickness of each layer, FIGS. 1 and 3 differ from each other in their aspect ratios, so that FIG. 3 is closer to the actual aspect ratio than FIG. 1. The opening edge of the protective film 34, which is on the outer side of that of the other layers (the planarization layer 35, coupling layer 3, second filter region 25, optical filter layer 4, and protective film 5) in the structure of FIGS. 1 to 3, may be located at the same position as with the latter as seen in the Z axis.

A wire 7 is connected to each pad unit 33a through the through hole 6. For example, the wire 7 is made of Au and has one end with a ball part 7a which is bonded to the surface of the pad unit 33a under thermocompression while being provided with ultrasonic vibrations. A gap is formed between the inner surface of the through hole 6 and the ball part 7a in order to prevent the second filter region 25 and the like from being damaged in contact with the ball part 7a. The other end of the wire 7 is connected through the bottom wall 2a of the package 2 to a mounting pad unit 8 disposed on the outer surface of the bottom wall 2a.

When light enters the package 2 through the opening thereof in thus constructed spectroscopic sensor 1A, only a predetermined wavelength range of light to be incident on the first filter region 24 of the interference filter unit 20A in the light passing through the protective film 5 is transmitted through the optical filter layer 4. Here, the wavelength range of light transmitted through the optical filter layer 4 and the wavelength range of light transmitted through the second filter region 25 of the interference filter unit 20A differ from each other. For example, the wavelength range of light transmitted through the optical filter layer 4 is 800 nm to 1000 nm, while the wavelength range of light transmitted through the second filter region 25 is 800 nm or shorter and 1000 nm or longer.

When the light passing through the optical filter layer 4 is incident on the first filter region 24, a predetermined wavelength range of the light is selectively transmitted therethrough according to its incident position. The light transmitted through the first filter region 24 passes through the coupling layer 3, planarization layer 35, and protective film 34, so as to be made incident on the light-receiving surface 32a of the light detection substrate 30. Here, the wavelength of light incident on each channel of the light-receiving unit 32 of the light detection substrate 30 is determined uniquely by the thickness of the cavity layer 21 at the incident position and the materials and thicknesses of the first and second mirror layers 22, 23. As a consequence, different wavelengths of light are detected for the respective channels of the light-receiving unit 32 in the light detection substrate 30.

In the spectroscopic sensor 1A, as explained in the foregoing, the first filter region 24 for transmitting therethrough light to be incident on the light-receiving surface 32a of the light detection substrate 30 is surrounded by the ring-shaped second filter region 25 as seen in the Z axis. This allows the second filter region 25 to protect the first filter region 24, thereby preventing filter characteristics of the first filter region 24 from deteriorating. This can also protect a region surrounding the light-receiving unit 32 in the light detection substrate 30. In addition, the distance between the first and second mirror layers 22, 23 is fixed in the second filter region 25. This can narrow the wavelength range of light transmittable through the second filter region 25, thereby restraining various wavelengths of noise light from entering the first filter region 24.

The light detection substrate 30 also has a plurality of pad units 33a for the leads 33 so that they are contained in the second filter region 25 as seen in the Z axis, while the wires 7 are connected to the respective pad units 33a through the through holes 6 formed in the second filter region 25. As a consequence, when seen in the Z axis, the second filter region 25 exists in a ring-shaped area about the first filter region 24 passing the inside of the through holes 6 and an area between the through holes 6, 6 adjacent to each other (see FIG. 2). Hence, even when the through holes 6 for connecting the pad units 33a to the wires 7 are formed, noise light can be restrained from entering the first filter region 24.

While the optical filter layer 4 transmitting therethrough not only the light incident on the first filter region 24 but also the light incident on the second filter region 25 is provided, the wavelength range of light transmitted through the optical filter layer 4 and the wavelength range of light transmitted through the second filter region 25 differ from each other. This lets the optical filter layer 4 and the second filter region 25 cooperate with each other, so that the wavelength range of light transmittable through both of the optical filter layer 4 and second filter region 25 becomes narrower, thereby making it possible to more strongly restrain noise light from entering the first filter region 24.

The cavity layer 21 is formed continuously in the first and second filter regions 24, 25. This can stabilize the cavity layer 21 in terms of strength and characteristic.

The first mirror layer 22 is formed continuously in the first and second filter regions 24, 25, while the second mirror layer 23 is formed continuously in the first and second filter regions 24, 25. This can stabilize the first and second mirror layers 22, 23 in terms of strength and characteristic.

The second filter region 25 contains the first filter region 24 as seen in a direction perpendicular to the Z axis. This lets the second filter region 25 receive external forces, if any, acting along the Z axis and thus can prevent the first filter region 24 from being damaged.

A method for manufacturing the above-mentioned spectroscopic sensor 1A will now be explained. The following steps may be performed by using a wafer formed with a plurality of members corresponding to respective spectroscopic sensors 1A, such that the wafer is finally diced into the spectroscopic sensors 1A, each constructed by the light detection substrate 30 having the interference filter unit 20A bonded thereto.

Figure 4:
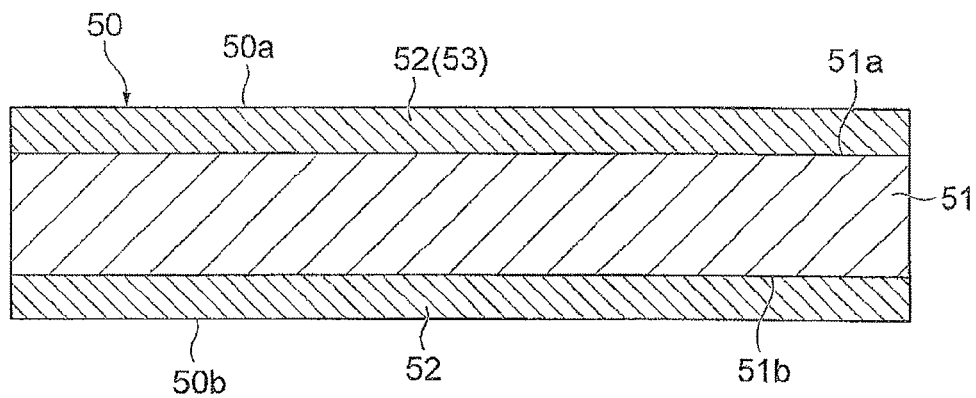
FIG. 4 is a set of vertical sectional views for explaining a method for manufacturing the spectroscopic sensor of FIG. 1.
Figure 4:
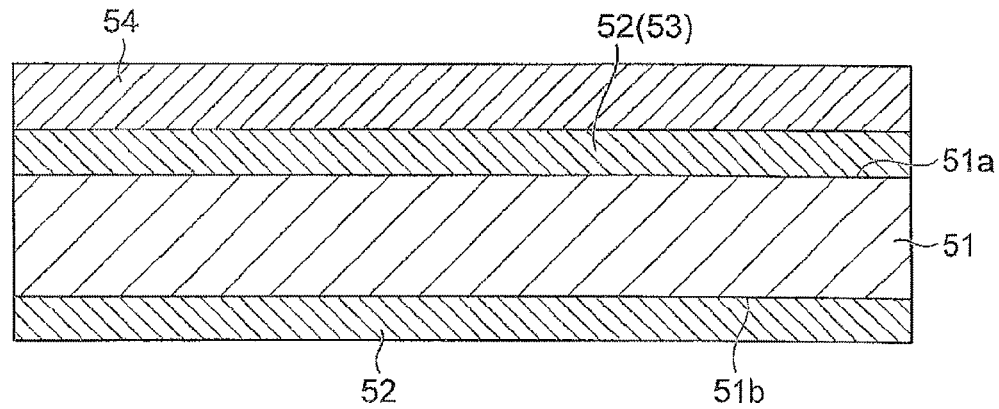

First, as illustrated in FIG. 4(a), principal surfaces 50a, 50b of a silicon substrate 50 are thermally oxidized, so as to form silicon oxide films 52 on principal surfaces 51a, 51b of a handle substrate 51 made of silicon, and the silicon oxide film 52 formed on one of the principal surfaces 51a, 51b of the handle substrate 51 is employed as a surface layer 53. Here, the silicon oxide film 52 formed on one principal surface 51a of the handle substrate 51 is assumed to be the surface layer 53.

Figure 5:
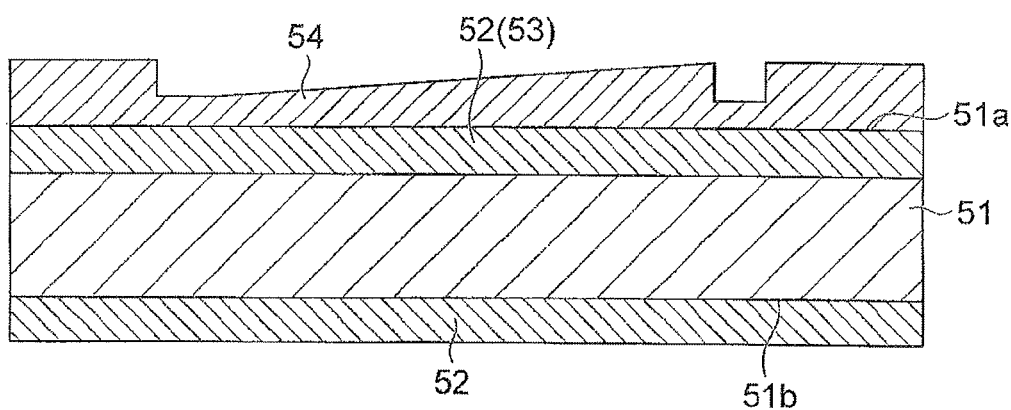
FIG. 5 is a set of vertical sectional views for explaining the method for manufacturing the spectroscopic sensor of FIG. 1.
Figure 5:
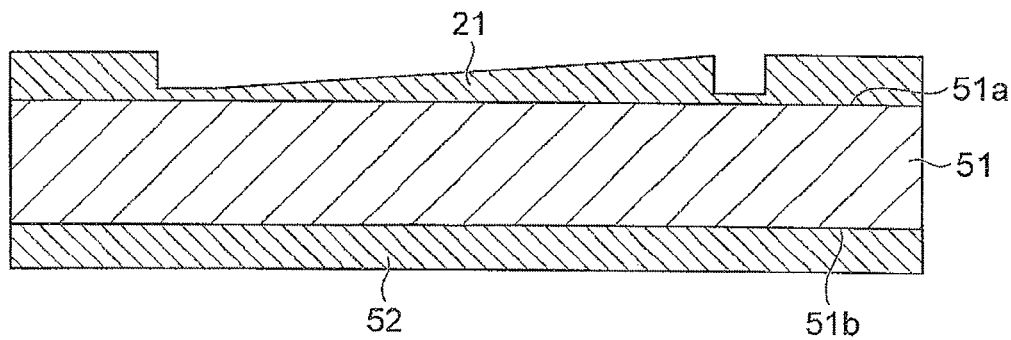

Subsequently, a resist layer 54 is applied onto the surface layer 53 as illustrated in FIG. 4(b) and then is patterned as illustrated in FIG. 5(a) in order to form the cavity layer 21 by etching. Thereafter, as illustrated in FIG. 5(b), the surface layer 53 disposed on the handle substrate 51 is etched (etched back) through the resist layer 54 serving as a mask, so as to form the cavity layer 21.

Figure 6:
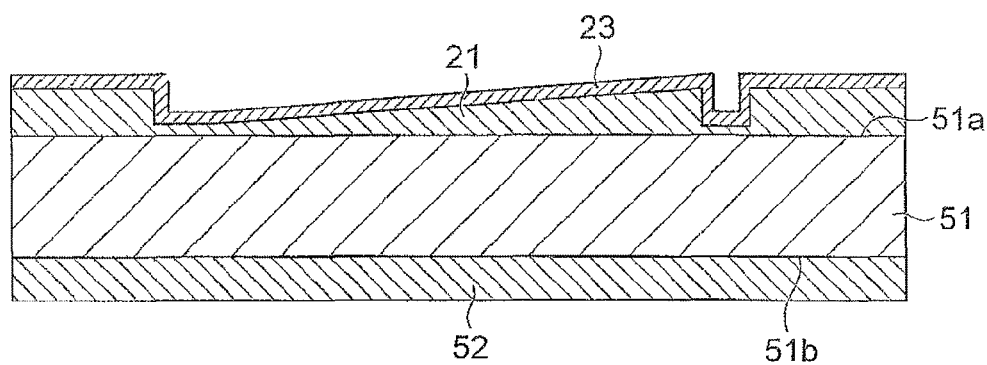
FIG. 6 is a set of vertical sectional views for explaining the method for manufacturing the spectroscopic sensor of FIG. 1.
Figure 6:
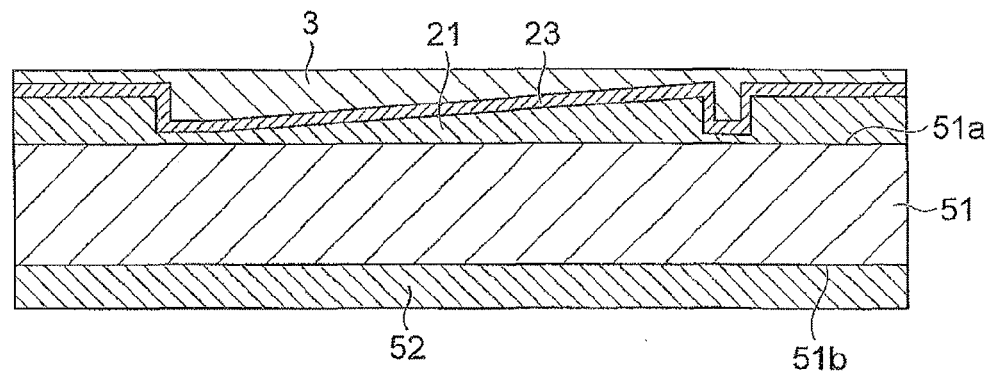

Next, as illustrated in FIG. 6(a), the second mirror layer 23 is formed on the cavity layer 21. When forming the second mirror layer 23, a film is formed by ion plating, vapor deposition, sputtering, or the like and, if necessary, photoetched and lifted off, or patterned by etching. Subsequently, as illustrated in FIG. 6(b), a silicon oxide film is formed so as to cover the second mirror layer 23, and its surface is planarized by CMP, so as to form the coupling layer 3.

Figure 7:
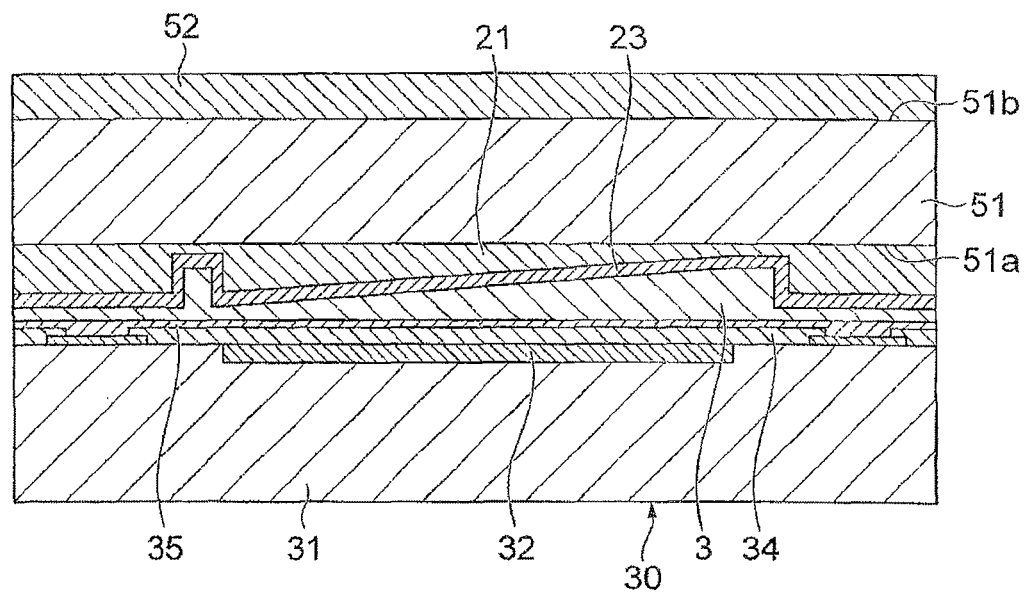
FIG. 7 is a set of vertical sectional views for explaining the method for manufacturing the spectroscopic sensor of FIG. 1.
Figure 7:
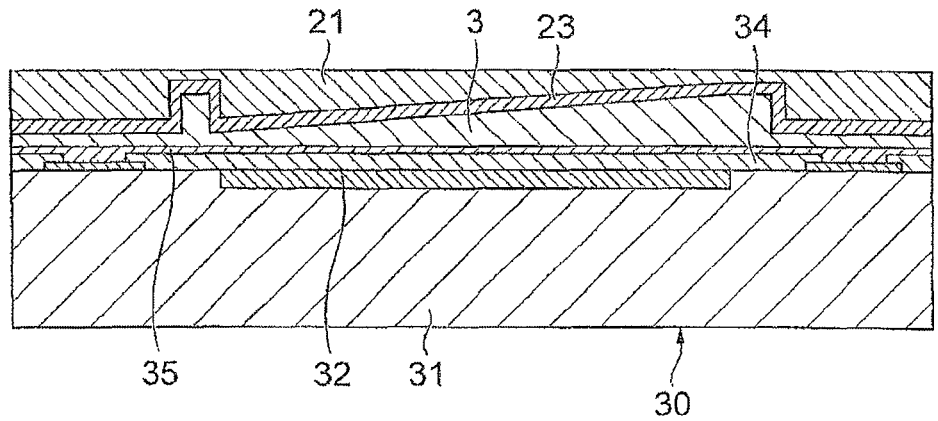

Then, as illustrated in FIG. 7(a), the surface of the coupling layer 3 is directly bonded (by surface-activated bonding or the like) to the surface of the planarization layer 35 of the light detection substrate 30. Subsequently, as illustrated in FIG. 7(b), grinding, polishing, etching, and the like are performed, so as to remove the silicon oxide film 52 and handle substrate 51.

Figure 8:
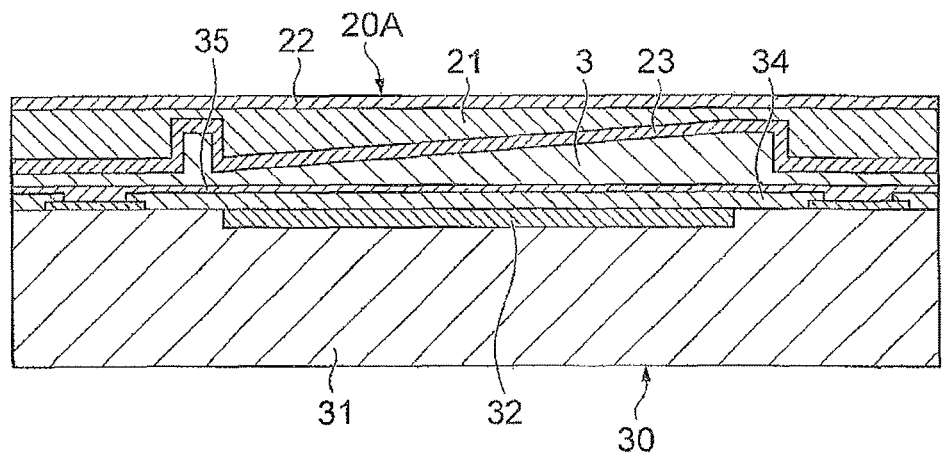
FIG. 8 is a set of vertical sectional views for explaining the method for manufacturing the spectroscopic sensor of FIG. 1.
Figure 8:
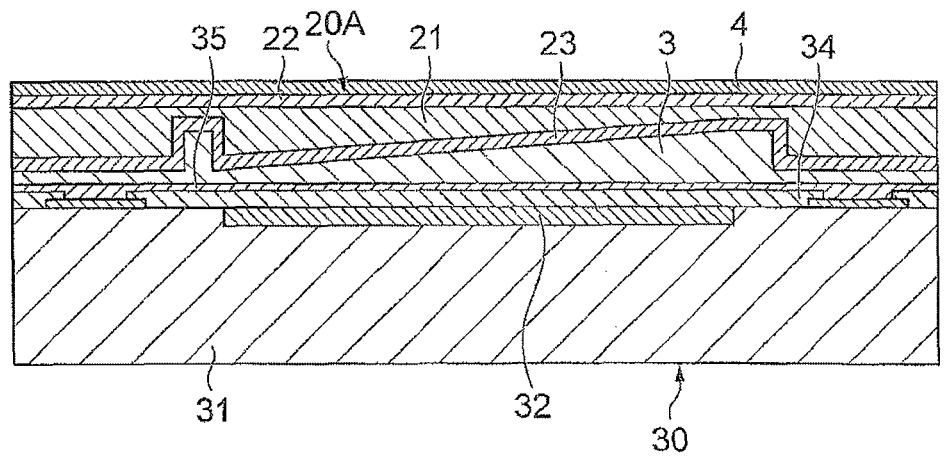

Thereafter, as illustrated in FIG. 8(a), the first mirror layer 22 is formed as with the second mirror layer 23 on the cavity layer 21 exposed by removing the handle substrate 51. This makes the first and second mirror layers 22, 23 oppose each other through the cavity layer 21, thereby forming the interference filter unit 20A.

Figure 9:
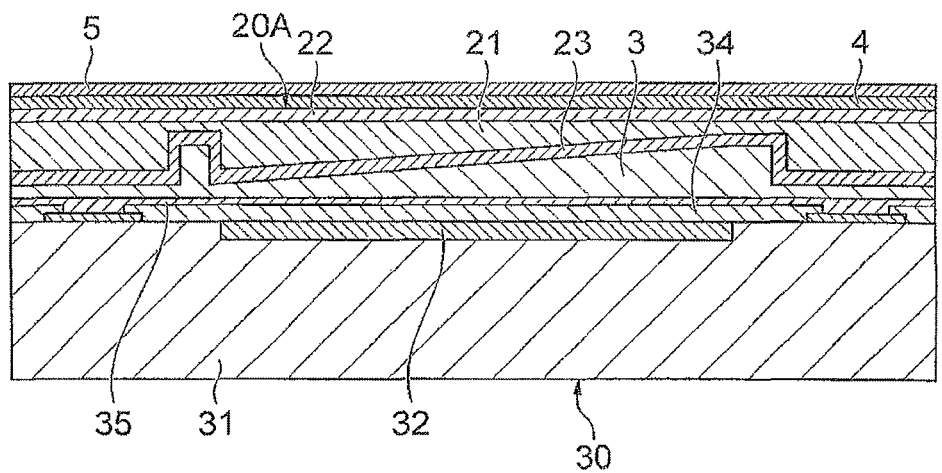
FIG. 9 is a set of vertical sectional views for explaining the method for manufacturing the spectroscopic sensor of FIG. 1.
Figure 9:
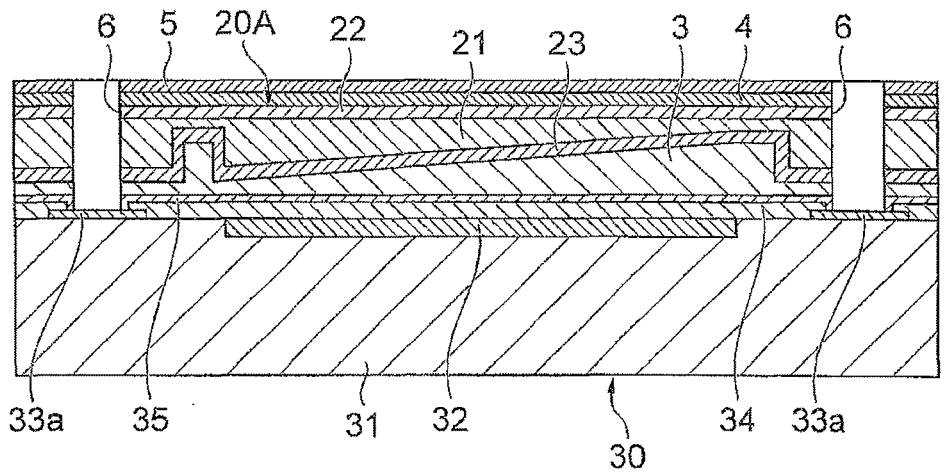

Next, the optical filter layer 4 is formed on the first mirror layer 22 as illustrated in FIG. 8(b), and the protective film 5 is formed on the optical filter layer 4 as illustrated in FIG. 9(a). When forming the optical filter layer 4 from a dielectric multilayer film, film forming by ion plating, vapor deposition, sputtering, or the like and photoetching and liftoff, or patterning by etching are performed. When formed from an organic color filter, the optical filter layer 4 is patterned by exposure to light, development, and the like as with a photoresist.

Subsequently, as illustrated in FIG. 9(b), a part of the light detection substrate 30 which corresponds to each pad unit 33a is etched, so as to form the through hole 6. Then, as illustrated in FIG. 1, the light detection substrate 30 having the interference filter unit 20A bonded thereto is secured to the bottom wall 2a of the package 2. Thereafter, one end of the wire 7 is connected to the pad unit 33a through the through hole 6, while the other end of the wire 7 is connected to the pad unit 8 through the bottom wall 2a of the package 2, so as to yield the spectroscopic sensor 1A.

Figure 10:
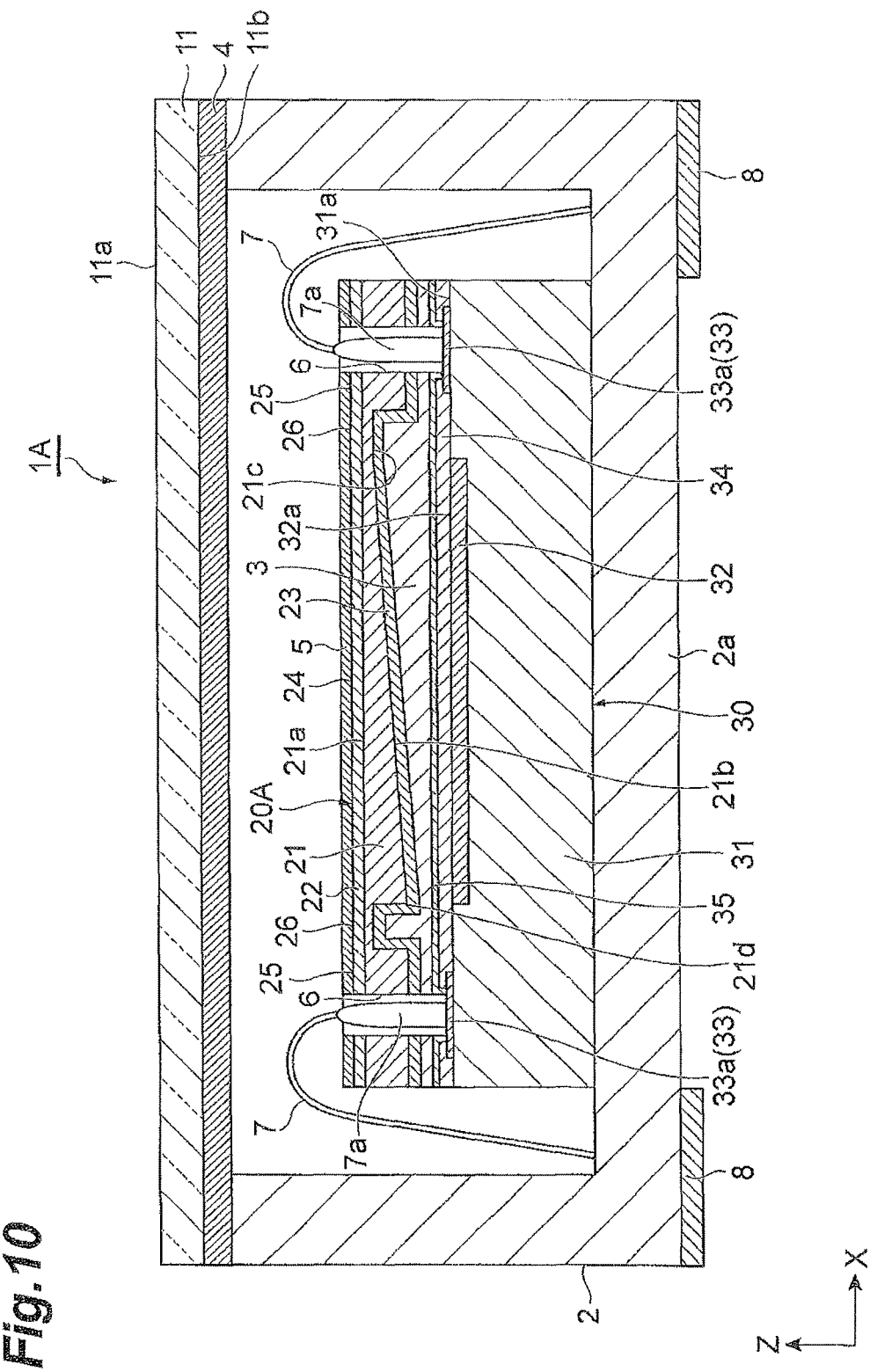
FIG. 10 is a vertical sectional view of a modified example of the spectroscopic sensor of FIG. 1.

As illustrated in FIG. 10, a light-transmitting substrate 11 may be attached to the opening of the package 2 in the spectroscopic sensor 1A in accordance with the first embodiment.

For example, the light-transmitting substrate 11 is made of glass or the like and has a thickness on the order of several hundreds of μm to several mm. The optical filter layer 4 may be formed on at least one of the front face 11a and rear face 11b of the light-transmitting substrate 11. In this case, the optical filter layer 4 is not required to be formed on the first mirror layer 22. Color glass or filter glass which can transmit therethrough a predetermined wavelength range of light may also be used as a material for the light-transmitting substrate 11.

Figure 11:
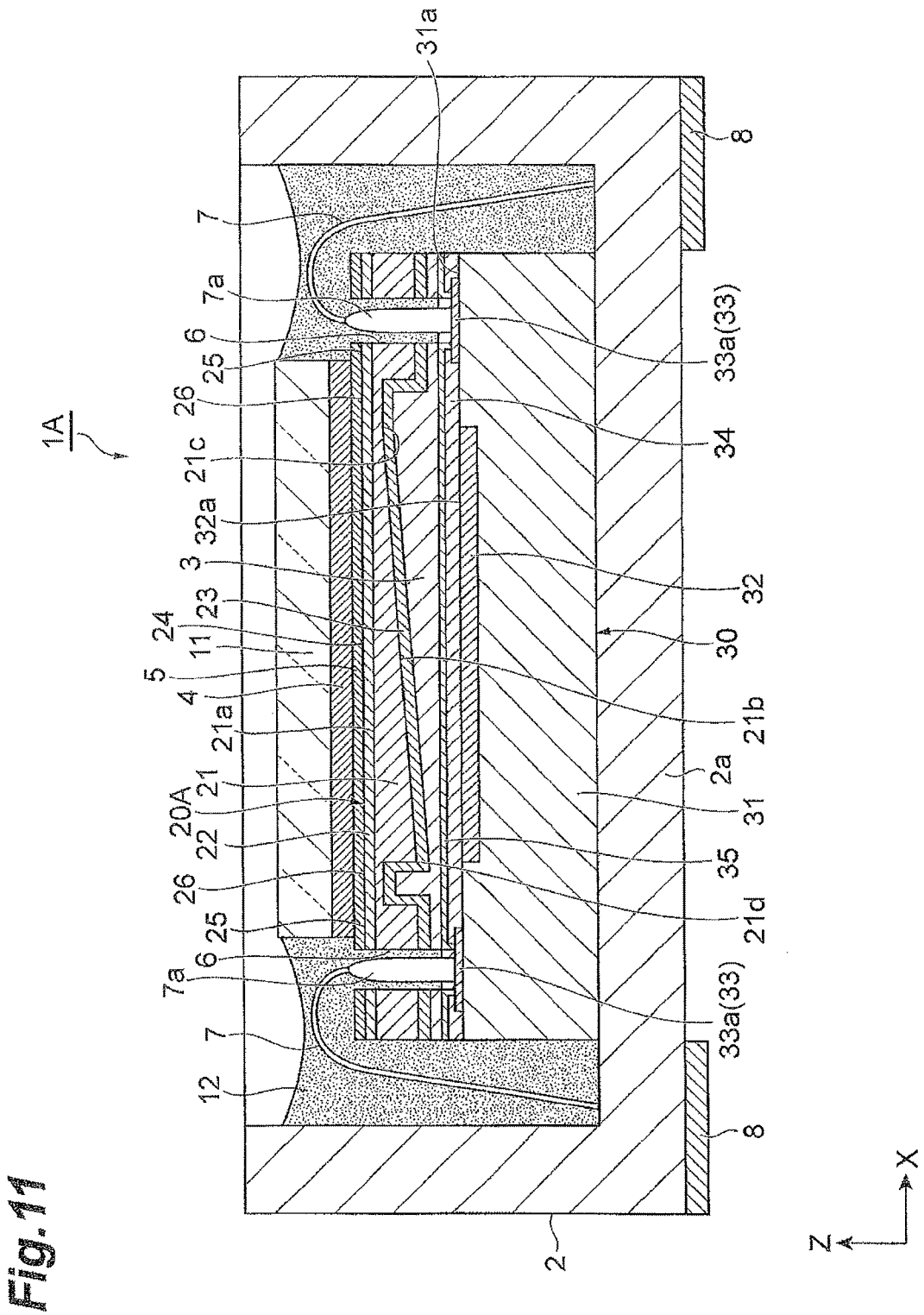
FIG. 11 is a vertical sectional view of a modified example of the spectroscopic sensor of FIG. 1.

As illustrated in FIG. 11, the light-transmitting substrate 11 formed with the optical filter layer 4 may be joined onto the protective film 5 through an optical resin material or the like or by direct bonding. In this case, the optical filter layer 4 is not required to be formed on the first mirror layer 22. Interstices between the light detection substrate 30 and interference filter unit 20A and inner surfaces of side walls of the package 2 may be filled with a light-absorbing resin material 12. This structure can more securely prevent noise light from entering the first filter region 24. In all of the modes of the spectroscopic sensor 1A, the protective film 5 may be omitted.

Second Embodiment

Figure 12:
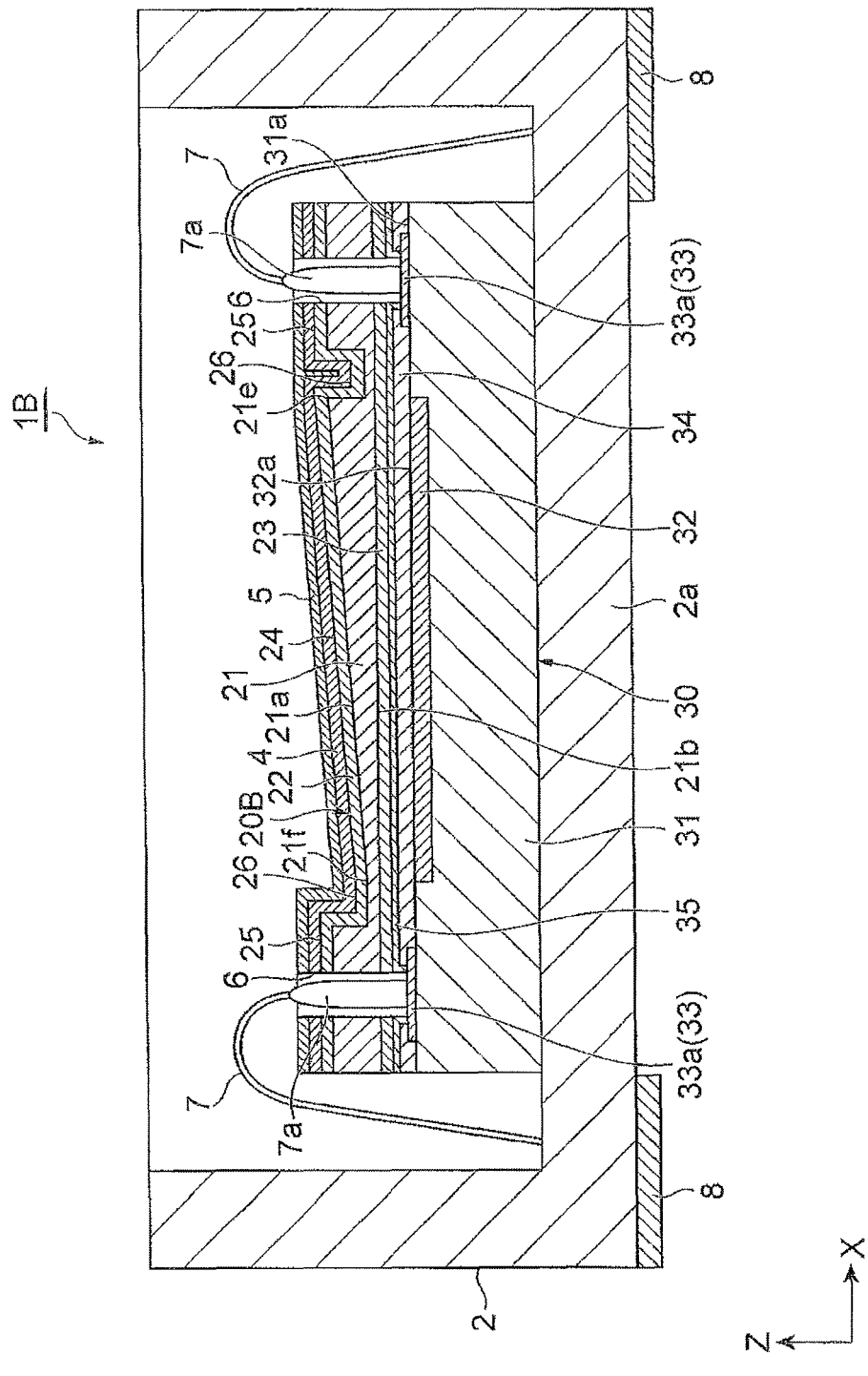
FIG. 12 is a vertical sectional view of the spectroscopic sensor in accordance with a second embodiment of the present invention.

As illustrated in FIG. 12, a spectroscopic sensor 1B of the second embodiment differs from the spectroscopic sensor 1A of the first embodiment mainly in the structure of an interference filter unit 20B. In the following, the spectroscopic sensor 1B of the second embodiment will be explained with a focus on the structure of the interference filter unit 20B.

In the spectroscopic sensor 1B, the interference filter unit 20B is formed on the planarization layer 35 of the light detection substrate 30. The interference filter unit 20B has the cavity layer 21 and the first and second mirror layers 22, 23 opposing each other through the cavity layer 21. The interference filter unit 20B is an LVF which transmits therethrough a predetermined wavelength range of light according to its incident position from the first mirror layer 22 side to the second mirror layer 23 side.

The interference filter unit 20B has the first filter region 24, second filter region 25, and connection region 26. The first filter region 24 corresponds to the light-receiving surface 32a of the light detection substrate 30 as seen in the Z axis. The second filter region 25 surrounds the first filter region 24 like a ring with the connection region 26 interposed therebetween as seen in the Z axis. The second filter region 25 contains the first filter region 24 as seen in a direction perpendicular to the Z axis.

The front face 21a of the cavity layer 21 in the first filter region 24 tilts with respect to the XY plane such that one end 21e in the X-axis direction of the front face 21a is separated from the plane including the light-receiving surface 32a more than is the other end 21f in the X-axis direction of the front face 21a. On the other hand, the rear face 21b of the cavity layer 21 in the first filter region 24 is parallel to the XY plane.

The front face 21a and rear face 21b of the cavity layer 21 in the second filter region 25 are parallel to the XY plane. The distance from the plane including the light-receiving surface 32a to the front face 21a of the cavity layer 21 in the second filter region 25 equals the distance from the plane including the light-receiving surface 32a to one end 21e of the front face 21a of the cavity layer 21 in the first filter region 24. On the other hand, the distance from the plane including the light-receiving surface 32a to the rear face 21b of the cavity layer 21 in the second filter region 25 equals the distance from the plane including the light-receiving surface 32a to the rear face 21b of the cavity layer 21 in the first filter region 24. For example, the thickness of the cavity layer 21 in the second filter region 25 is about 700 nm.

The front face 21a and rear face 21b of the cavity layer 21 in the connection region 26 are parallel to the XY plane. The distance from the plane including the light-receiving surface 32a to the front face 21a of the cavity layer 21 in the connection region 26 equals the distance from the plane including the light-receiving surface 32a to the other end 21f of the front face 21a of the cavity layer 21 in the first filter region 24. On the other hand, the distance from the plane including the light-receiving surface 32a to the rear face 21b of the cavity layer 21 in the connection region 26 equals the distance from the plane including the light-receiving surface 32a to the rear face 21b of the cavity layer 21 in the first filter region 24. For example, the thickness of the cavity layer 21 in the connection region 26 is about 500 nm.

As in the foregoing, the cavity layer 21 is formed continuously over the first filter region 24, second filter region 25, and connection region 26. The front face 21a of the cavity layer 21 has a difference in level between the first filter region 24 and the connection region 26 which becomes the largest at one end 21e and the smallest (0 here) at the other end 21f. The front face 21a of the cavity layer 21 has a fixed difference in level between the second filter region 25 and the connection region 26. On the other hand, the rear face 21b of the cavity layer 21 is flush in the first filter region 24, second filter region 25, and connection region 26.

The first mirror layer 22 is formed continuously on the front face 21a of the cavity layer 21 and the vertical surfaces of the difference in level over the first filter region 24, second filter region 25, and connection region 26. On the other hand, the second mirror layer 23 is formed continuously on the rear face 21b of the cavity layer 21 over the first filter region 24, second filter region 25, and connection region 26. Hence, the distance between the first and second mirror layers 22, 23 varies in the first filter region 24. The distance between the first and second mirror layers 22, 23 is fixed in the second filter region 25.

A plurality of through holes 6 for exposing the pad units 33a to the outside are formed in the second filter region 25 for the respective pad units 33a. Each through hole 6 penetrates through the protective film 34, planarization layer 35, coupling layer 3, second filter region 25 (i.e., the cavity layer 21 and first and second mirror layers 22, 23), optical filter layer 4, and protective film 5 along the Z axis, so as to expose a part (or whole) of the pad unit 33a to the outside. The opening edge of the protective film 34 may be located at the same position as with that of the other layers (the planarization layer 35, coupling layer 3, second filter region 25, optical filter layer 4, and protective film 5) as seen in the Z axis.

When light enters the package 2 through the opening thereof in thus constructed spectroscopic sensor 1B, only a predetermined wavelength range of light to be incident on the first filter region 24 of the interference filter unit 20B in the light passing through the protective film 5 is transmitted through the optical filter layer 4. Here, the wavelength range of light transmitted through the optical filter layer 4 and the wavelength range of light transmitted through the second filter region 25 of the interference filter unit 20B differ from each other.

When the light passing through the optical filter layer 4 is incident on the first filter region 24, a predetermined wavelength range of the light is selectively transmitted therethrough according to its incident position. The light transmitted through the first filter region 24 passes through the planarization layer 35 and protective film 34, so as to be made incident on the light-receiving surface 32a of the light detection substrate 30. Here, the wavelength of light incident on each channel of the light-receiving unit 32 of the light detection substrate 30 is determined uniquely by the thickness of the cavity layer 21 at the incident position and the materials and thicknesses of the first and second mirror layers 22, 23. As a consequence, different wavelengths of light are detected for the respective channels of the light-receiving unit 32 in the light detection substrate 30.

In the spectroscopic sensor 1B, as explained in the foregoing, the first filter region 24 for transmitting therethrough light to be incident on the light-receiving surface 32a of the light detection substrate 30 is surrounded by the ring-shaped second filter region 25 as seen in the Z axis. This allows the second filter region 25 to protect the first filter region 24, thereby preventing filter characteristics of the first filter region 24 from deteriorating. This can also protect a region surrounding the light-receiving unit 32 in the light detection substrate 30. In addition, the distance between the first and second mirror layers 22, 23 is fixed in the second filter region 25. This can narrow the wavelength range of light transmittable through the second filter region 25, thereby restraining various wavelengths of noise light from entering the first filter region 24.

The light detection substrate 30 also has a plurality of pad units 33a for the leads 33 so that they are contained in the second filter region 25 as seen in the Z axis, while the wires 7 are connected to the respective pad units 33a through the through holes 6 formed in the second filter region 25. As a consequence, when seen in the Z axis, the second filter region 25 exists in a ring-shaped area about the first filter region 24 passing the inside of the through holes 6 and an area between the through holes 6, 6 adjacent to each other. Hence, even when the through holes 6 for connecting the pad units 33a to the wires 7 are formed, noise light can be restrained from entering the first filter region 24.

While the optical filter layer 4 transmitting therethrough not only the light incident on the first filter region 24 but also the light incident on the second filter region 25 is provided, the wavelength range of light transmitted through the optical filter layer 4 and the wavelength range of light transmitted through the second filter region 25 differ from each other. This lets the optical filter layer 4 and the second filter region 25 cooperate with each other, so that the wavelength range of light transmittable through both of the optical filter layer 4 and second filter region 25 becomes narrower, thereby making it possible to more strongly restrain noise light from entering the first filter region 24.

The cavity layer 21 is formed continuously in the first and second filter regions 24, 25. This can stabilize the cavity layer 21 in terms of strength and characteristic.

The first mirror layer 22 is formed continuously in the first and second filter regions 24, 25, while the second mirror layer 23 is formed continuously in the first and second filter regions 24, 25. This can stabilize the first and second mirror layers 22, 23 in terms of strength and characteristic.

The second filter region 25 contains the first filter region 24 as seen in a direction perpendicular to the Z axis. This lets the second filter region 25 receive external forces, if any, acting along the Z axis and thus can prevent the first filter region 24 from being damaged.

A method for manufacturing the above-mentioned spectroscopic sensor 1B will now be explained. The following steps may be performed by using a wafer formed with a plurality of members corresponding to respective spectroscopic sensors 1B, such that the wafer is finally diced into the spectroscopic sensors 1B, each constructed by the light detection substrate 30 having the interference filter unit 20B bonded thereto.

Figure 13:
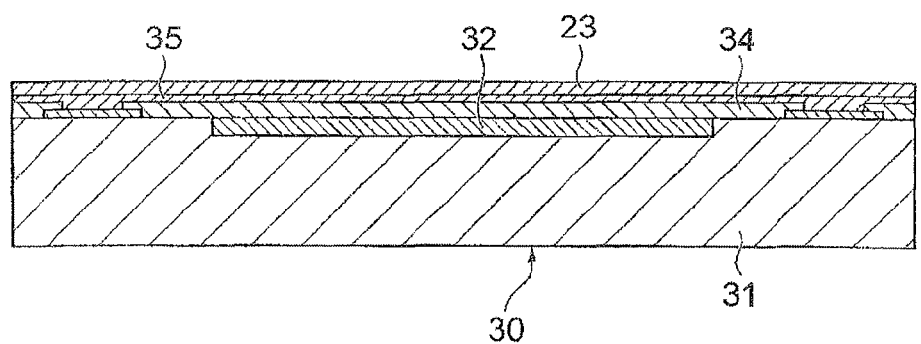
FIG. 13 is a set of vertical sectional views for explaining a method for manufacturing the spectroscopic sensor of FIG. 12.
Figure 13:
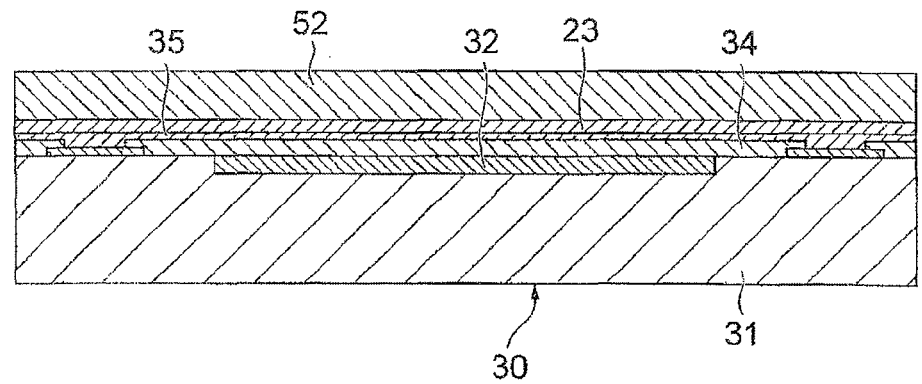

First, as illustrated in FIG. 13(a), the second mirror layer 23 is formed on the surface of the planarization layer 35 of the light detection substrate 30. When forming the second mirror layer 23, a film is formed by ion plating, vapor deposition, sputtering, or the like and, if necessary, photoetched and lifted off, or patterned by etching. Subsequently, as illustrated in FIG. 13(b), a silicon oxide film 52 is formed on the second mirror layer 23, and its surface is planarized by CMP if necessary.

Figure 14:
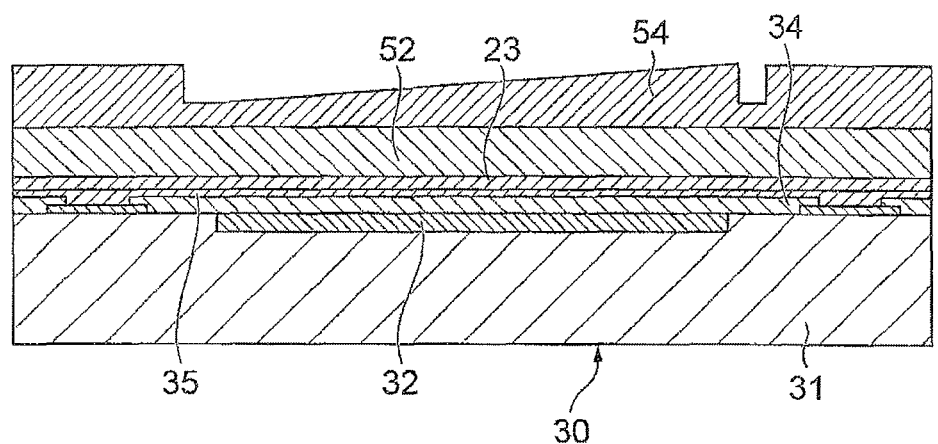
FIG. 14 is a set of vertical sectional views for explaining the method for manufacturing the spectroscopic sensor of FIG. 12.
Figure 14:
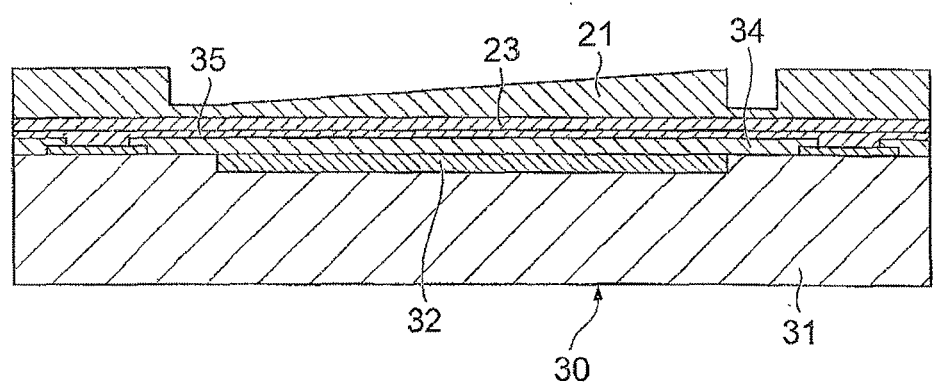

Next, as illustrated in FIG. 14(a), the resist layer 54 is applied onto the silicon oxide film 52 and patterned in order to form the cavity layer 21 by etching. Then, as illustrated in FIG. 14(b), the silicon oxide film 52 is etched (etched back) through the resist layer 54 serving as a mask, so as to form the cavity layer 21.

Figure 15:
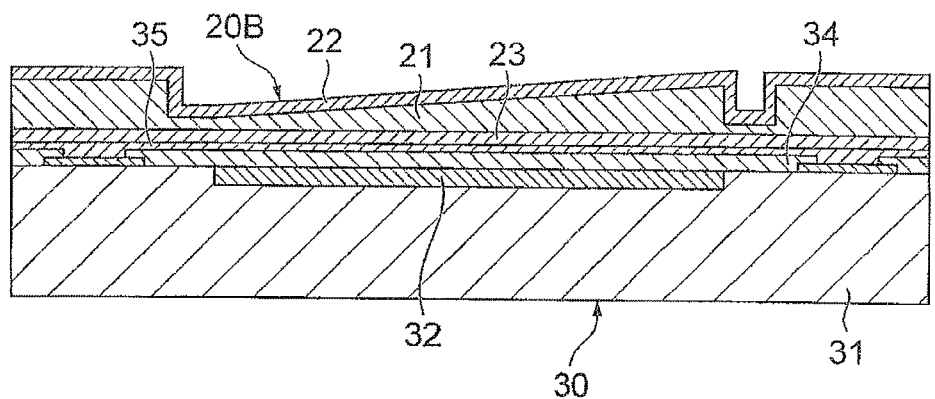
FIG. 15 is a set of vertical sectional views for explaining the method for manufacturing the spectroscopic sensor of FIG. 12.
Figure 15:
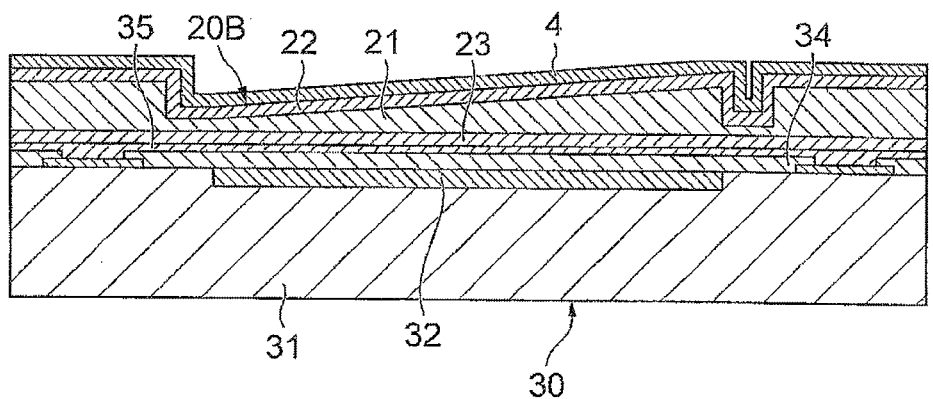

Subsequently, as illustrated in FIG. 15(a), the first mirror layer 22 is formed on the cavity layer 21 as with the second mirror layer 23. This makes the first and second mirror layers 22, 23 oppose each other through the cavity layer 21, thereby forming the interference filter unit 20B. Then, the optical filter layer 4 is formed on the first mirror layer 22 as illustrated in FIG. 15(b), and the protective film 5 is formed on the optical filter layer 4 as illustrated in FIG. 16(a).

Figure 16:
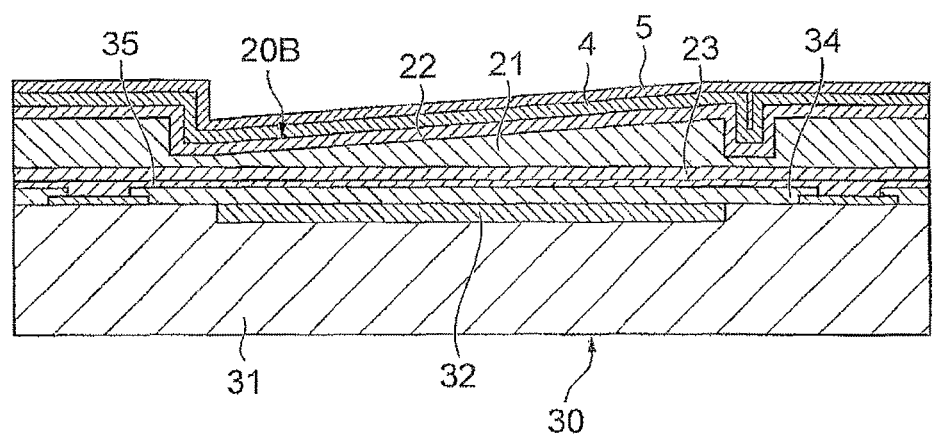
FIG. 16 is a set of vertical sectional views for explaining the method for manufacturing the spectroscopic sensor of FIG. 12.
Figure 16:
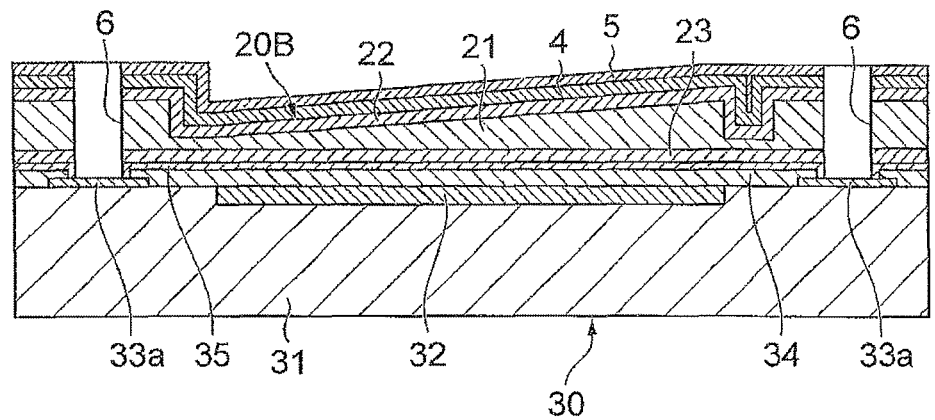

Next, as illustrated in FIG. 16(b), a part of the light detection substrate 30 which corresponds to each pad unit 33a is etched, so as to form the through hole 6. Subsequently, as illustrated in FIG. 12, the light detection substrate 30 formed with the interference filter unit 20B is secured to the bottom wall 2a of the package 2. Then, one end of the wire 7 is connected to the pad unit 33a through the through hole 6, while the other end of the wire 7 is connected to the pad unit 8 through the bottom wall 2a of the package 2, so as to yield the spectroscopic sensor 1B.

Figure 17:
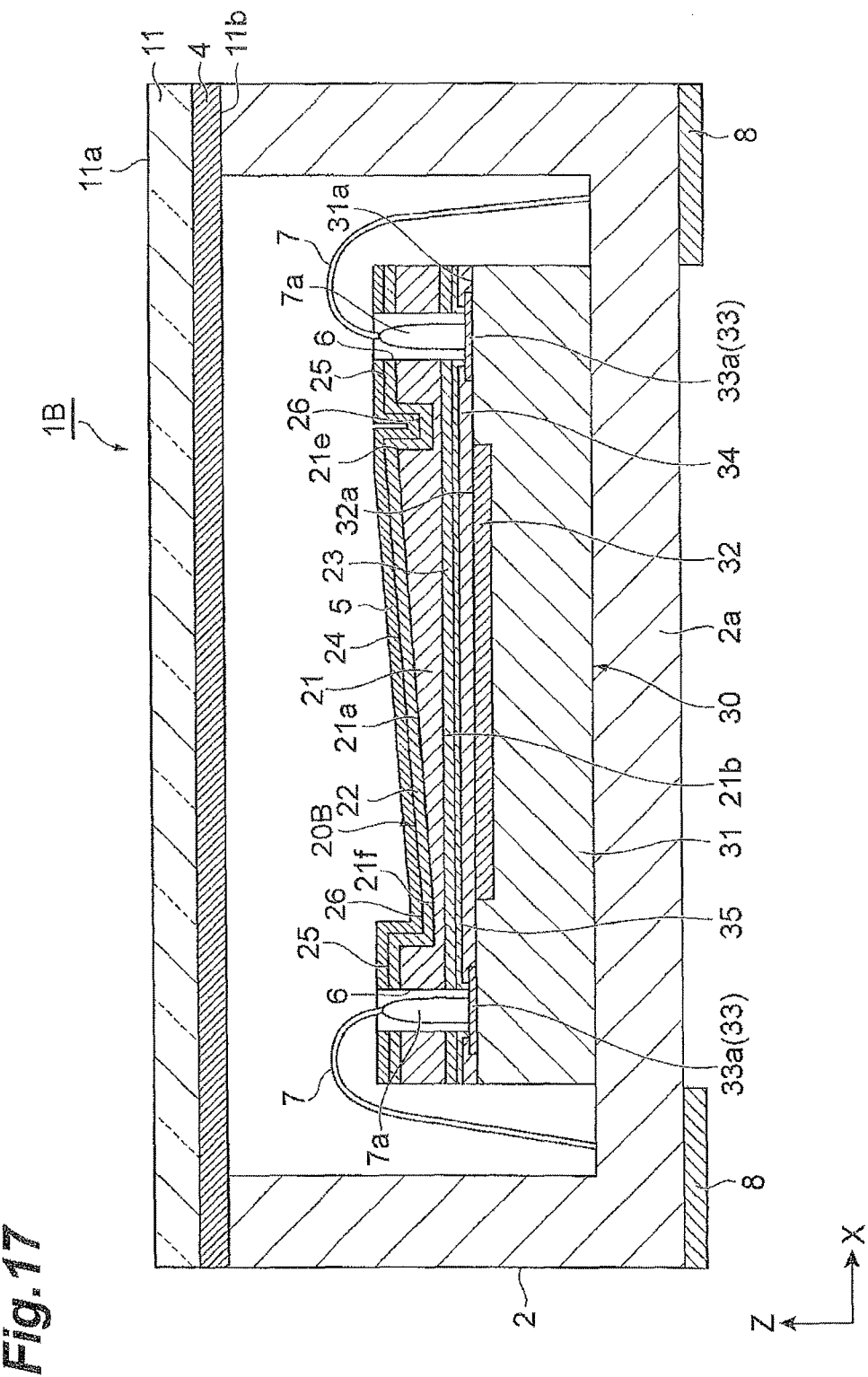
FIG. 17 is a vertical sectional view of a modified example of the spectroscopic sensor of FIG. 12.

As illustrated in FIG. 17, the light-transmitting substrate 11 may be attached to the opening of the package 2 in the spectroscopic sensor 1B of the second embodiment as in the spectroscopic sensor 1A of the first embodiment. The optical filter layer 4 may be formed on at least one of the front face 11a and rear face 11b of the light-transmitting substrate 11. In this case, the optical filter layer 4 is not required to be formed on the first mirror layer 22. Color glass or filter glass which can transmit therethrough a predetermined wavelength range of light may also be used as a material for the light-transmitting substrate 11.

Figure 18:
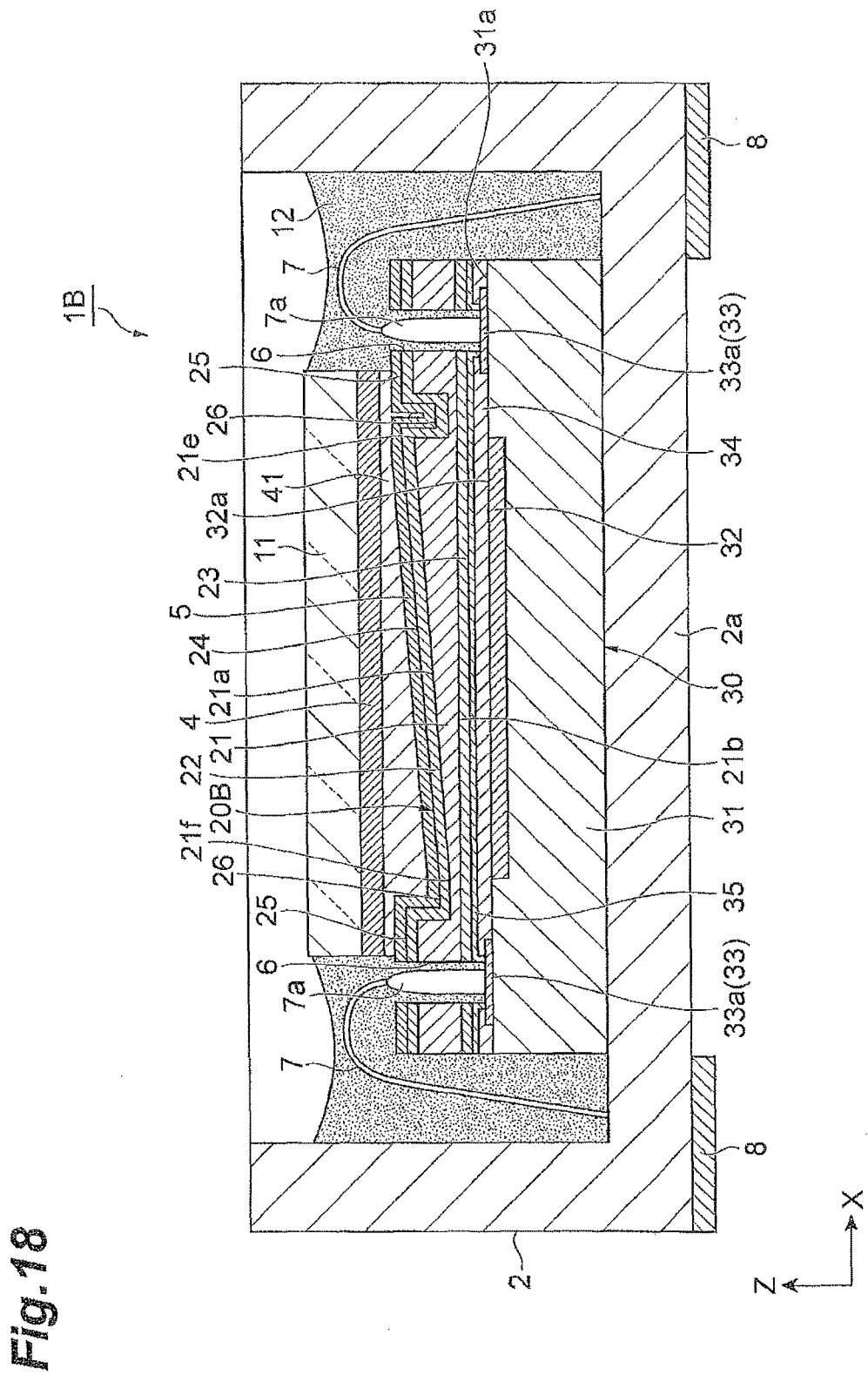
FIG. 18 is a vertical sectional view of a modified example of the spectroscopic sensor of FIG. 12.

As illustrated in FIG. 18, the light-transmitting substrate 11 formed with the optical filter layer 4 may be joined onto the protective film 5 through an optical resin material 41. In this case, the optical filter layer 4 is not required to be formed on the first mirror layer 22. Interstices between the light detection substrate 30 and interference filter unit 20B and inner surfaces of side walls of the package 2 may be filled with the light-absorbing resin material 12. This structure can more securely prevent noise light from entering the first filter region 24. In all of the modes of the spectroscopic sensor 1B, the protective film 5 may be omitted. Grooves formed in the connection region 26 may be filled with the protective film 5 as illustrated in FIG. 12 or not as illustrated in FIG. 18.

While the first and second embodiments of the present invention are explained in the foregoing, the present invention is not limited thereto. For example, constituent members of the spectroscopic sensor may employ various materials and forms without being restricted to those mentioned above. By way of example, the cavity layer may be made of materials such as $TiO_2$, $Ta_2O_5$, SiN, Si, Ge, $Al_2O_3$, and light-transmitting resins. A material for the first and second mirror layers may be a metal film constituted by Al, Au, Ag, or the like having a thickness on the order of several nm to several μm. The sizes of the constituent members of the spectroscopic sensor are illustrated by way of example only. By "fixed" in the present invention and embodiments is meant not only completely fixed but also substantially fixed within ranges of errors in manufacture and the like. The same holds for "same," "parallel," "perpendicular," "equal," "flush," and the like.

In the first filter region of the interference filter unit, the thickness of the cavity layer may vary two-dimensionally (not only along the X axis but also along the Y axis) or stepwise. The light detection substrate is not limited to the one-dimensional sensor but may be a two-dimensional sensor. The light detection substrate may also be a back-illuminated semiconductor light-receiving element.

In the interference filter unit, the first filter region and the second filter region surrounding the same may be connected directly to each other without forming the connection region. A region where the distance between the first and second mirror layers is not fixed or a region free of the first and second mirror layers may be formed about the second filter region.

The interference filter unit may have a plurality of first filter regions. In this case, the second filter region may be formed for each first filter region or a plurality of first filter regions so as to surround the same.

For joining the light detection substrate and the interference filter unit to each other, bonding with an optical resin material or at an outer edge part of the spectroscopic sensor may be employed. Examples of optical resin materials usable for bonding include organic materials of epoxy, acrylic, and silicone types and hybrid materials composed of organic and inorganic substances. The bonding at the outer edge part of the spectroscopic sensor may be done with low-melting glass, solder, or the like while holding a gap with a spacer. In this case, the area surrounded by the bonding part may be left as an air gap or filled with an optical resin material.

The interference filter unit may have a first filter region corresponding to the light-receiving surface as seen in a predetermined direction intersecting the light-receiving surface and a ring-shaped second filter region surrounding the first filter region as seen in the predetermined direction. The distance in the predetermined direction between the first and second mirror layers may be variable in the first filter region and fixed in the second filter region. Here, the structure of the spectroscopic sensor can be simplified when the predetermined direction is perpendicular to the light-receiving surface of the light detection substrate.

In the light detection substrate 30, the protective film 34 may be formed in an area similar to that of the planarization layer 35 so as to function as a planarization layer. In this case, the planarization layer 35 is not required to be provided separately. As for the optical filter layer 4 and protective film 5 formed on the interference filter unit 20A, 20B, the protective film 5 may be formed on the interference filter unit 20A, 20B side, and the optical filter layer 4 may be formed on the protective film 5. The second filter region 25 may be formed thinner than the first filter region 24. An antireflection film for preventing light incident on the light-receiving surface 32a of the light detection substrate 30 from being reflected may be provided between the light-receiving surface 32a and the second mirror layer 23. For example, the antireflection film is a single-layer film or multilayer film made of $Al_2O_3$, $TiO_2$, $Ta_2O_5$, $SiO_2$, SiN, $MgF_2$, or the like and has a thickness on the order of several tens of nm to several tens of p.m. The protective film 34 or planarization layer 35 may be a film functioning as an antireflection film. Instead of providing such an antireflection film, the surface on the interference filter unit 20A, 20B side of the light detection substrate 30 may be subjected to antireflection processing. Examples of the antireflection processing include surface roughening such as black silicon processing and nanopillar structures. The antireflection film and antireflection processing can restrain stray light from occurring due to multireflection and interference of light between the second mirror layer 23 and the light-receiving surface 32a of the light detection substrate 30, thereby further improving filter characteristics.

Figure 19:
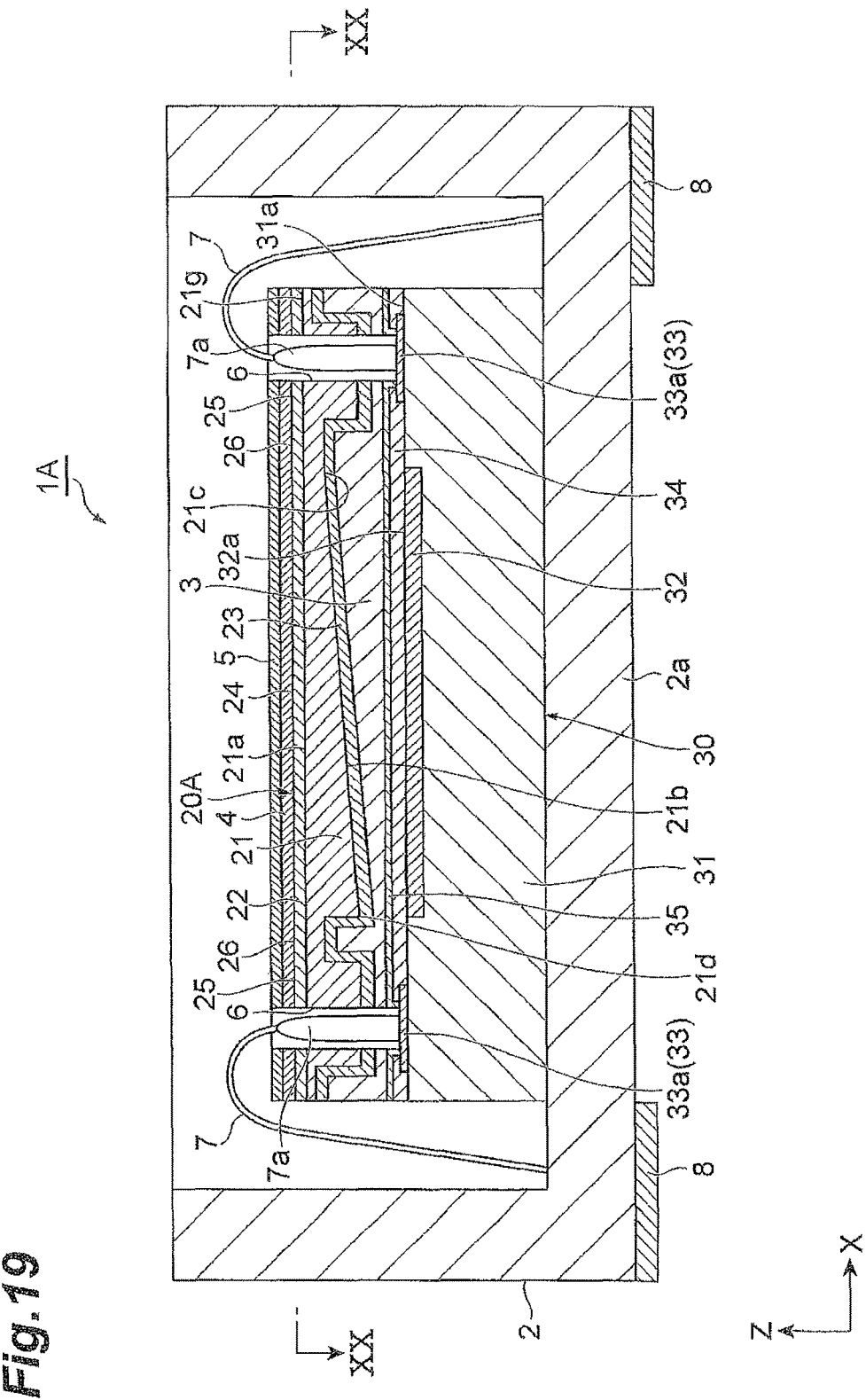
FIG. 19 is a vertical sectional view of the spectroscopic sensor of another embodiment in accordance with the present invention.

As illustrated in FIGS. 19 and 20, the cavity layer 21 may have an outer edge part 21g formed along its outer edge. The outer edge part 21g is formed thinner than the cavity layer 21 in the second filter region 25 and connection region 26. For example, the thickness of the cavity layer 21 is about 700 nm in the second filter region 25 and about 500 nm in the connection region 26, while the thickness of the outer edge part 21g is on the order of 400 nm to 500 nm. The width of the outer edge part 21g is 50 μm or less. Thus constructed outer edge part 21g yields the following effects. The first and second mirror layers 22, 23 also formed on both sides of the outer edge part 21g can further restrict light transmitted through the outer side of the second filter region and restrain it from becoming stray light. When dicing a wafer formed with a plurality of members each corresponding to the spectroscopic sensor 1A, 1B, dicing lines are formed by photoetching and etching. Reflected light and transmitted light change their colors between parts where the cavity layer 21 is thinner (the outer edge part 21g) and thicker (the cavity layer 21 in the second filter region 25). Light may also scatter strongly at an edge between the parts where the cavity layer 21 is thinner and thicker. These make it possible to discern (recognize) the dicing lines clearly.

The spectroscopic sensor can be constructed as SMD (Surface Mount Device), CSP (Chip Size Package), BGA (Ball Grid Array), COB (Chip On Board), COF (Chip On Film), COG (Chip On Glass), and the like.

INDUSTRIAL APPLICABILITY

The present invention can provide a spectroscopic sensor which can prevent filter characteristics of a filter region transmitting therethrough light to be incident on the light-receiving surface of the light detection substrate from deteriorating and restrain noise light from entering the filter region.

REFERENCE SIGNS LIST 1A, 1B: spectroscopic sensor; 4: optical filter layer (optical filter unit); 6: through hole; 7: wire; 20A, 20B: interference filter unit; 21: cavity layer; 22: first mirror layer; 23: second mirror layer; 24: first filter region; 25: second filter region; 30: light detection substrate; 32a: light-receiving surface; 33: lead; 33a: pad unit.

The invention claimed is:
1. A spectroscopic sensor comprising:
an interference filter unit, having a cavity layer and first and second mirror layers opposing each other through the cavity layer, for selectively transmitting therethrough a predetermined wavelength range of light according to an incident position thereof from the first mirror layer side to the second mirror layer side; and a light detection substrate, having a light-receiving surface for receiving the light transmitted through the interference filter unit, for detecting the light incident on the light-receiving surface;

wherein the interference filter unit has a first filter region corresponding to the light-receiving surface as seen in a predetermined direction intersecting the light-receiving surface and a ring-shaped second filter region surrounding the first filter region as seen in the predetermined direction;

wherein the distance in the predetermined direction between the first and second mirror layers varies in the first filter region; and wherein the distance in the predetermined direction between the first and second mirror layers is fixed in the second filter region.

2. A spectroscopic sensor according to claim 1, wherein the light detection substrate has a plurality of pad units for wiring contained in the second filter region as seen in the predetermined direction;

wherein the second filter region is formed with a plurality of through holes for the respective pad units for exposing the pad units to the outside; and wherein wires are connected to the respective pad units through the through holes.

3. A spectroscopic sensor according to claim 1, further comprising an optical filter unit for transmitting therethrough at least the light incident on the second filter region;

wherein a wavelength range of the light transmitted through the optical filter unit and a wavelength range of the light transmitted through the second filter region are different from each other.

4. A spectroscopic sensor according to claim 1, wherein the cavity layer is formed continuously in the first and second filter regions.

5. A spectroscopic sensor according to claim 1, wherein the first mirror layer is formed continuously in the first and second filter regions; and wherein the second mirror layer is formed continuously in the first and second filter regions.

6. A spectroscopic sensor according to claim 1, wherein the second filter region contains the first filter region as seen in a direction parallel to the light-receiving surface.

7. A spectroscopic sensor according to claim 1, wherein the predetermined direction is a direction perpendicular to the light-receiving surface.

* * * * *